United States Patent
Desforges et al.

(10) Patent No.: US 12,194,617 B2
(45) Date of Patent: Jan. 14, 2025

(54) MEASURING ARM WITH MULTIFUNCTIONAL END

(71) Applicant: HEXAGON METROLOGY SAS, Courtaboeuf (FR)

(72) Inventors: Laurent Desforges, Amboly (FR); Thibault Duportal, Prunay Cassereau (FR); Denis Roux, Villemardy (FR); Jean-Luc Famechon, Villerable (FR); Wes Inglis, Vista, CA (US)

(73) Assignee: HEXAGON METROLOGY SAS, Courtaboeuf (FR)

( * ) Notice: Subject to any disclaimer, the term of this patent is extended or adjusted under 35 U.S.C. 154(b) by 849 days.

(21) Appl. No.: 17/142,181

(22) Filed: Jan. 5, 2021

(65) Prior Publication Data

US 2021/0122058 A1   Apr. 29, 2021

Related U.S. Application Data

(63) Continuation of application No. PCT/EP2019/068028, filed on Jul. 4, 2019.

(30) Foreign Application Priority Data

Jul. 6, 2018 (FR) ....................... 1856251

(51) Int. Cl.
 *G01B 7/012*  (2006.01)
 *B25J 1/02*   (2006.01)
 (Continued)

(52) U.S. Cl.
 CPC .............. *B25J 13/088* (2013.01); *B25J 1/02* (2013.01); *B25J 13/06* (2013.01); *B25J 15/0019* (2013.01); *G01B 7/012* (2013.01); *G01B 5/0004* (2013.01)

(58) Field of Classification Search
 CPC ... B25J 1/02; B25J 13/06; B25J 13/088; B25J 15/0019; G01B 5/0004; G01B 5/012;
 (Continued)

(56) References Cited

U.S. PATENT DOCUMENTS 4,738,033 A    4/1988  Ferber et al.
6,151,789 A *  11/2000  Raab ................... G01B 21/047
                                                      33/503

(Continued)

FOREIGN PATENT DOCUMENTS

CN   103913137 B    3/2018
EP      694158 B1   5/1999
(Continued)

OTHER PUBLICATIONS

Anonymous—Wikipedia. "Baïonnette (fixation)" Jun. 20, 2018 (Jun. 20, 2018), Retrieved from the Internet: https://fr.wikipedia.org/w/index.php?title=Ba%C3%A Fonnette Jfixation)&oldid=149690600 [retrieved on Nov. 9, 2018] XP055522602 the whole document (with English translation).

(Continued)

Primary Examiner — Alexander A Mercado
(74) Attorney, Agent, or Firm — Nutter McClennen & Fish LLP

(57) ABSTRACT

A three-dimensional measuring device, comprising an arm having a free end provided with an interface body carrying a measuring member and a handle enabling an operator to point the measuring member at a zone of the object that is to be measured, the measuring device being characterized in that the handle is tubular in shape with a grippable outside surface and an inside surface that defines a housing in which there is engaged a reinforcing portion of a fastener base, which portion has an end portion that projects from the handle and that is fastened to the interface body.

17 Claims, 22 Drawing Sheets

(51) Int. Cl.
  *B25J 13/06* (2006.01)
  *B25J 13/08* (2006.01)
  *B25J 15/00* (2006.01)
  *G01B 5/00* (2006.01)

(58) Field of Classification Search
  CPC ...... G01B 5/008; G01B 7/012; G01B 11/005; G01B 21/04; G01B 21/047
  See application file for complete search history.

(56) References Cited

U.S. PATENT DOCUMENTS

| | | | |
|---|---|---|---|
| 6,892,465 B2* | 5/2005 | Raab | G01B 11/03 33/DIG. 1 |
| 7,743,524 B2 | 6/2010 | Eaton et al. | |
| RE42,082 E* | 2/2011 | Raab | G01B 11/005 33/503 |
| 8,229,208 B2 | 7/2012 | Pulla et al. | |
| 8,677,643 B2* | 3/2014 | Bridges | G05B 19/401 33/503 |
| 8,763,267 B2 | 7/2014 | Duportal et al. | |
| 10,197,433 B2 | 2/2019 | Key | |
| 11,466,975 B2 | 10/2022 | Desforges et al. | |
| 11,543,236 B2 | 1/2023 | Desforges et al. | |
| 11,673,257 B2* | 6/2023 | Phipps | F16C 11/045 33/503 |
| 2003/0193659 A1 | 10/2003 | Uomori et al. | |
| 2005/0166413 A1 | 8/2005 | Crampton | |
| 2008/0127501 A1 | 6/2008 | Eaton et al. | |
| 2009/0000136 A1 | 1/2009 | Crampton | |
| 2009/0010740 A1 | 1/2009 | Ferrari | |
| 2009/0013548 A1* | 1/2009 | Ferrari | G01B 21/04 33/503 |
| 2010/0095542 A1* | 4/2010 | Ferrari | G01B 11/007 33/503 |
| 2010/0272348 A1 | 10/2010 | Pulla et al. | |
| 2011/0112786 A1* | 5/2011 | Desforges | B25J 19/00 33/503 |
| 2011/0173827 A1* | 7/2011 | Bailey | G01B 21/047 33/503 |
| 2013/0125408 A1* | 5/2013 | Atwell | G01B 5/012 33/503 |
| 2013/0187022 A1* | 7/2013 | Duportal | G01B 5/008 248/543 |
| 2015/0192399 A1 | 7/2015 | Raab et al. | |
| 2016/0084633 A1* | 3/2016 | Ferrari | G01B 21/04 33/503 |
| 2016/0242861 A1 | 8/2016 | Flatt et al. | |
| 2016/0313114 A1* | 10/2016 | Tohme | H04N 13/257 |
| 2016/0327383 A1 | 11/2016 | Becker et al. | |
| 2018/0080841 A1 | 3/2018 | Cordoba et al. | |
| 2018/0216923 A1* | 8/2018 | Creachbaum | G01B 5/008 |
| 2020/0049477 A1* | 2/2020 | Lankalapalli | G01B 11/005 |
| 2021/0122057 A1* | 4/2021 | Desforges | B25J 1/02 |
| 2021/0122059 A1* | 4/2021 | Desforges | B25J 13/06 |
| 2021/0122060 A1 | 4/2021 | Desforges et al. | |
| 2021/0123718 A1* | 4/2021 | Desforges | G01B 21/04 |
| 2021/0123719 A1* | 4/2021 | Desforges | G01B 21/04 |
| 2022/0016647 A1 | 1/2022 | Klinkhammer | |
| 2023/0065449 A1 | 3/2023 | Torrie et al. | |
| 2023/0072293 A1 | 3/2023 | Koh et al. | |

FOREIGN PATENT DOCUMENTS

| | | |
|---|---|---|
| EP | 1577050 A1 | 9/2005 |
| FR | 2780775 A1 | 1/2000 |
| GB | 2373543 A | 9/2002 |
| JP | H08219 U | 2/1996 |
| WO | 3069266 A2 | 8/2003 |
| WO | 2011057130 A2 | 5/2011 |

OTHER PUBLICATIONS

International Search Report and Written Opinion for International Application No. PCT/EP2019/068018, mailed Sep. 3, 2019 (8 pages) English Translation.

International Search Report and Written Opinion for International Application No. PCT/EP2019/068037, mailed Sep. 4, 2019 (8 pages) English Translation.

International Search Report and Written Opinion for International Application No. PCT/EP2019/068032, mailed Sep. 3, 2019 (9 pages) English Translation.

International Search Report and Written Opinion for International Application No. PCT/EP2019/068028, mailed Sep. 3, 2019 (9 pages) English Translation.

International Search Report and Written Opinion for International Application No. PCT/EP2019/068024, mailed Sep. 3, 2019 (10 pages) English Translation.

International Search Report and Written Opinion for International Application No. PCT/EP2019/068019, mailed Nov. 11, 2019 (8 pages) English Translation.

* cited by examiner

MEASURING ARM WITH MULTIFUNCTIONAL END

CROSS-REFERENCE TO RELATED APPLICATIONS

This application is a continuation of International Patent Application No. PCT/EP2019/068028, filed Jul. 4, 2019, which claims priority to and the benefit of French Patent Application No. 18 56251, filed Jul. 6, 2018. The entire contents of each application are incorporated herein by reference in their entirety.

FIELD

The present invention relates to the field of metrology, and more particularly to measuring three-dimensional objects.

BACKGROUND

A three-dimensional measuring device generally comprises an arm made up of articulated elements including a fastener base, a first segment connected to the base by a first hinge, a second segment connected to the first segment by a second hinge, an interface body connected to the second segment by a third hinge, and position sensors associated with the hinges and electrically connected to an electronic acquisition unit for supplying the electronic acquisition unit with position measurement signals measuring the positions of the segments relative to one another. The interface body carries a measuring member and a handle enabling an operator to point the measuring member at a zone of the object that is to be measured.

The measuring member may be of the contact type or of the contactless type. A contact measuring member is a touch probe that is to be applied against said zone of the object. A contactless measuring member may be: a transmitter for transmitting an incident wave and a receiver for receiving a reflected wave reflected by said zone of the object, enabling a measurement to be made from the time lapse between transmitting the incident wave and receiving the reflected wave; or an optical device for capturing an image associated with a projector for projecting a light pattern to enable measurements to be calculated by processing the image of the light pattern projected onto the zone that is to be measured; or a combination of the above two techniques.

The handle is generally of the "pistol-grip" type. When the measuring member is of the contactless type, the handle is usually fitted with at least one button controlling a switch that is connected by an electrical circuit to the control unit so as to enable the operator to cause measurement signals to be acquired by using the hand that is holding the handle and pointing the measuring member. When the measuring member is of the contact type, the handle may be fitted as above with a button for controlling acquisition, or the switch may be controlled directly by the touch probe as a function of the force being applied by the touch probe on the zone of the object that is to be measured.

An object of the invention is to provide means for improving the functions of such a measuring device.

SUMMARY

To this end, the invention provides a three-dimensional measuring device, comprising an arm made up of articulated elements including a fastener base, a first segment connected to the base by a first hinge, a second segment connected to the first segment by a second hinge, an interface body connected to the second segment by a third hinge, and position sensors associated with the hinges and electrically connected to an electronic acquisition unit for supplying the electronic acquisition unit with position measurement signals measuring the positions of the segments relative to one another. The interface body carries a measuring member and a handle enabling an operator to point the measuring member at a zone of the object that is to be measured. The handle is tubular in shape with a grippable outside surface and an inside surface defining a housing in which there is engaged a reinforcing portion of a fastener base having an end portion that projects from the handle and that is fastened to the interface body, the reinforcing portion extending at least in part level with at least a portion of the grippable outside surface.

Advantageously, the reinforcing portion extends over a major fraction of the handle, and preferably over the entire length of the handle.

Other characteristics and advantages of the invention appear on reading the following description of particular, nonlimiting embodiments of the invention.

BRIEF DESCRIPTION OF THE DRAWINGS

Reference is made to the accompanying drawings, in which:

FIG. 16 is a section view of the remote measuring member on plane XVI of FIG. 12a;

DETAILED DESCRIPTION

Figure 1:
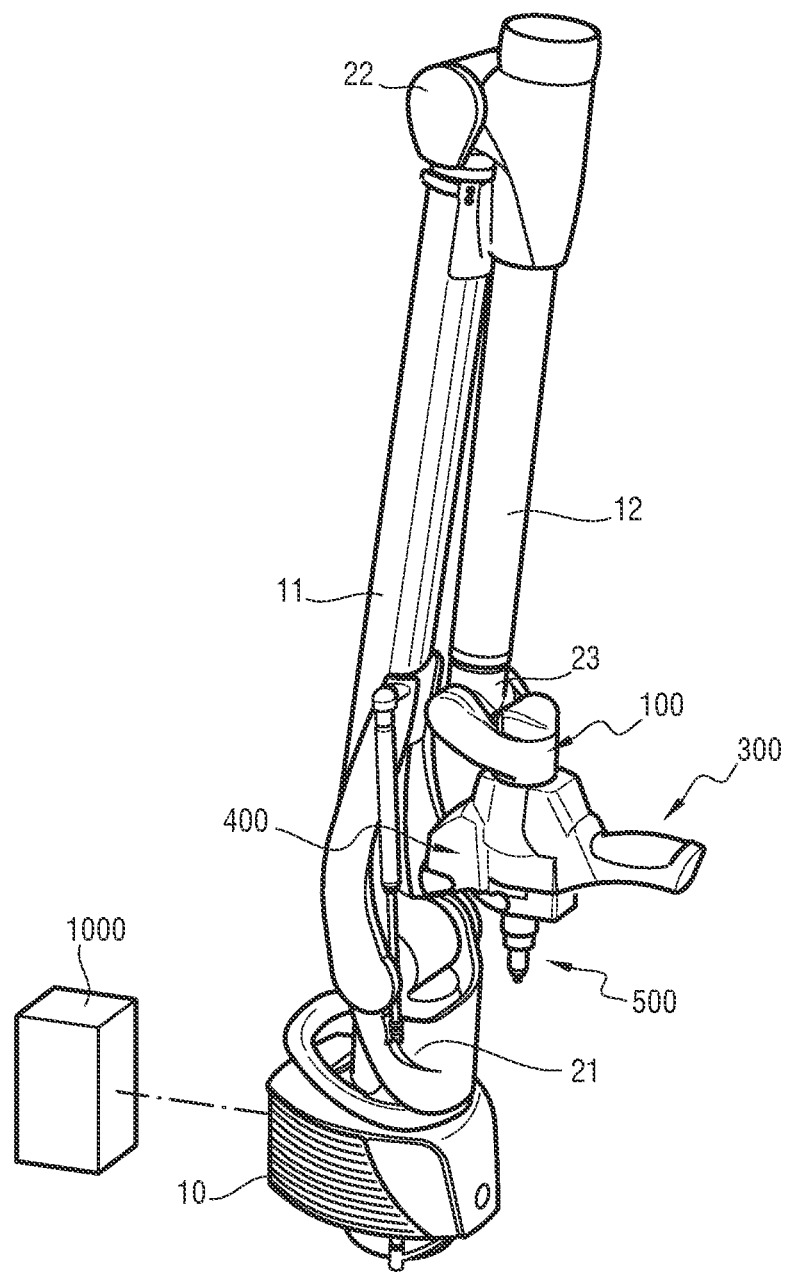
FIG. 1 is a perspective view of a measuring device of the invention.

With reference to the figures, the three-dimensional measuring device of the invention comprises an arm made up of articulated elements.

The articulated elements comprise a fastener base 10, a first segment 11 connected to the base 10 by a first hinge 21, a second segment 12 connected to the first segment 11 by a second hinge 22, and an interface body 100 connected to the second segment 12 by a third hinge 23.

Figure 2:
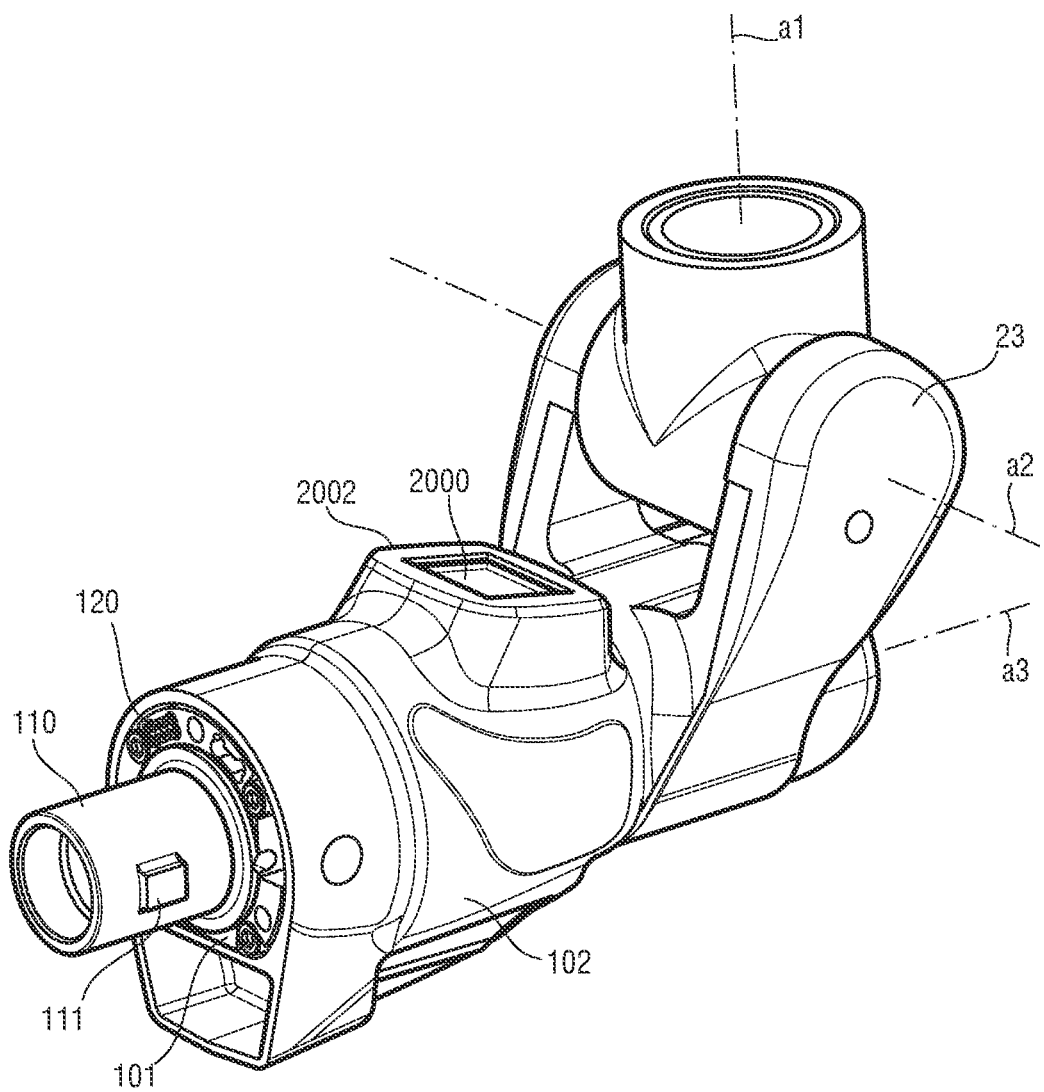
FIG. 2 is a perspective view of an interface body forming a free end of the arm of the measuring device.

The first hinge 21 and the second hinge 22 are double hinges allowing the elements that they connect together to pivot relative to each other about two mutually perpendicular axes. The third hinge 23 is a triple hinge allowing the second segment 12 and the interface body 100 to pivot relative to each other about three axes, one of which is substantially perpendicular relative to the others (the three axes being referenced a1, a2, and a3 in FIG. 2). Each axis of the hinges 21, 22, and 23 is associated with position sensors that are not visible in the figures and that are electrically connected to an electronic acquisition unit 1000 for supplying the electronic acquisition unit 1000 with measurement signals measuring the angular positions of the elements relative to one another. Each of the sensors may be connected to the acquisition unit 1000 by a respective cable pair, or they may all be connected together by a bus. By way of example, the acquisition unit may be a computer, and in particular a laptop computer, that is connected by a connector of universal serial bus (USB) or other type to a corresponding connector accessible from outside the base 10. The computer executes a three-dimensional measurement program that is itself known. The base 10 advantageously incorporates an electronic circuit connected to a screen and arranged to supply the operator with information about the operating state of the arm.

Figure 20:
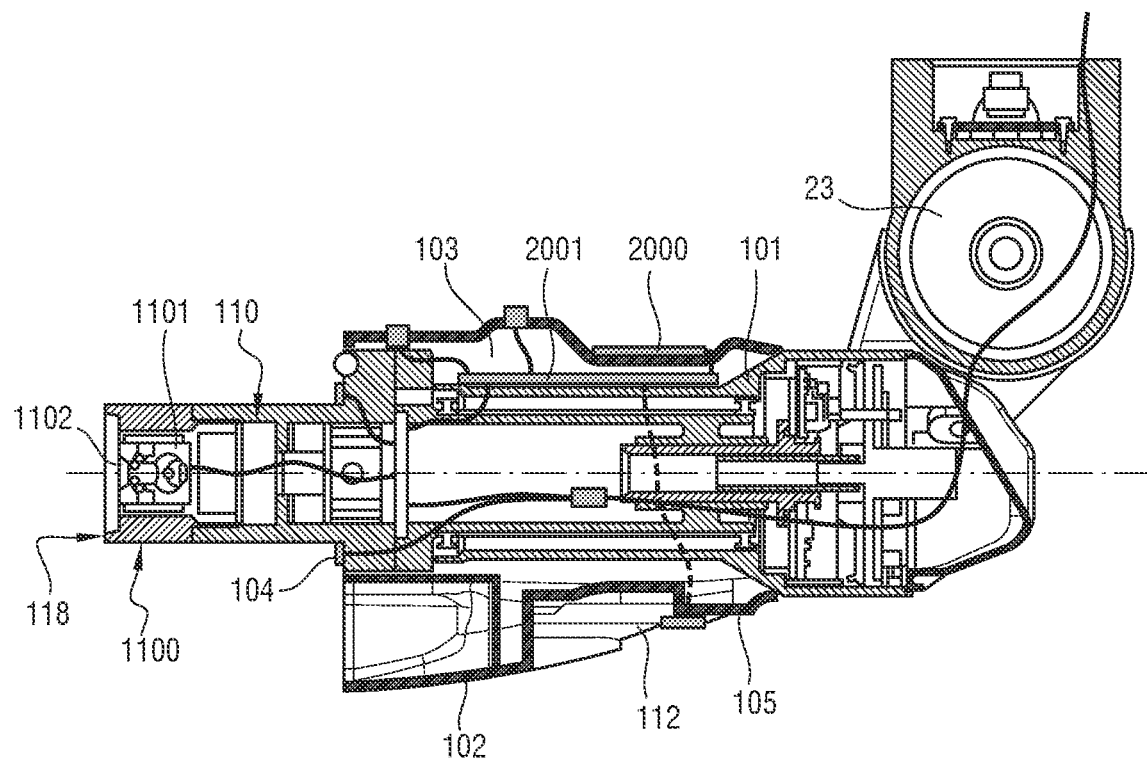
FIG. 20 is a longitudinal section view of the interface body.

The interface body 100 comprises a rigid structure 101 having a cover 102 mounted thereon in such a manner that a space 103 exists between the structure 101 and the cover 102 (see more particularly FIG. 20).

The interface body 100 is provided with a display device 2000 electrically connected to an electronic circuit 2001, itself electrically connected to the electronic acquisition unit 1000 by a dedicated line. The display device 2000 is fitted with a multidirectional button 2002 that is electrically connected to the electronic circuit 2001 in order to make selections in menus that are displayed by the display device 2000. The electronic circuit 2001 extends in the space 103 that exists between the structure 101 and the cover 102.

Figure 15:
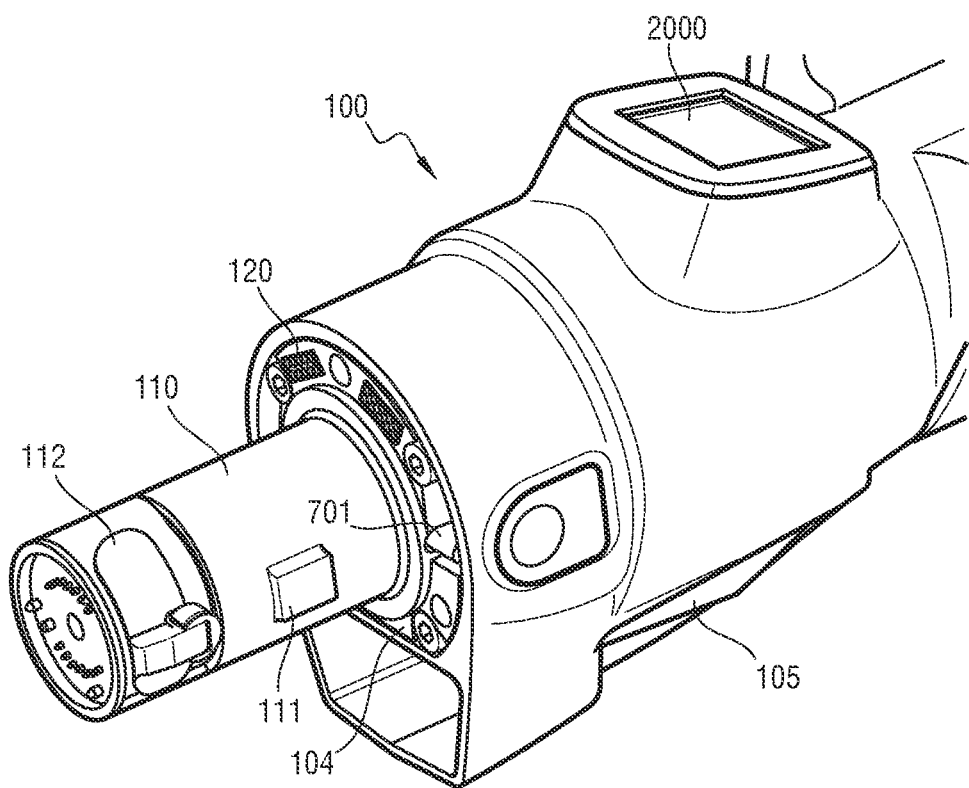
FIG. 15 is a detail view of the front portion of the interface body.
Figure 16:
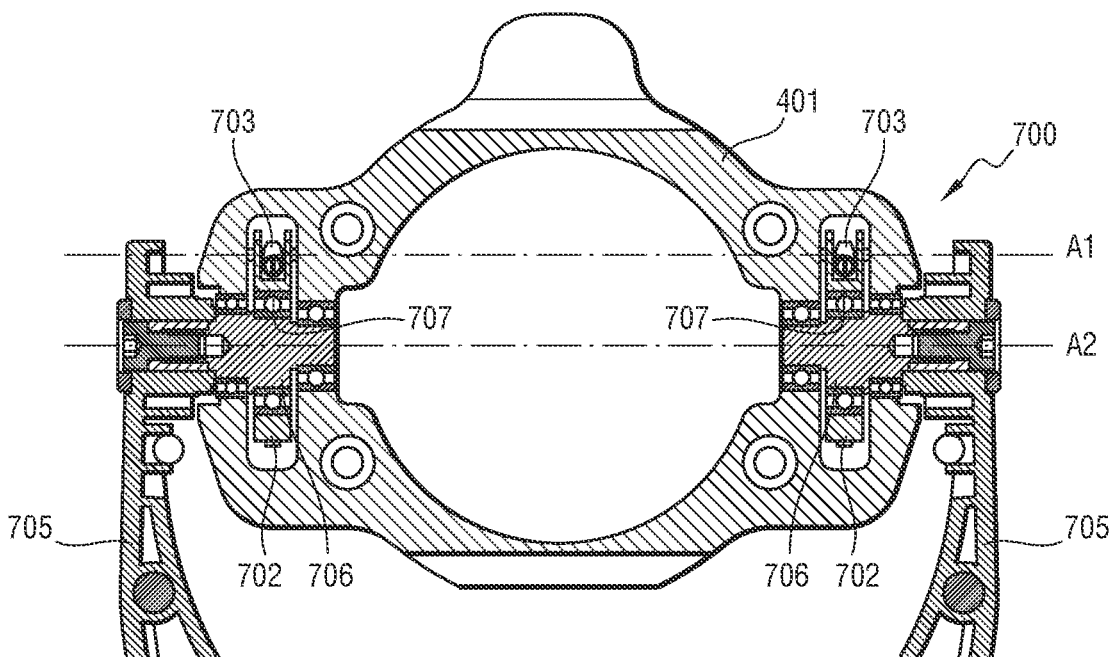

With reference more particularly to FIG. 15, the interface body 100 has: a front face 104 arranged to form a fastener plate for fastening either to a first grip member 200 or else to a remote measuring member 400; a tubular coupling part 110 for coupling to a contact measuring member 500 projecting from said front face 104; and also a side surface 105 arranged to form a second fastener plate for fastening to a second grip member 300.

The tubular coupling part 110 is provided with two external projections 111 that are positioned symmetrically relative to each other.

Electrical connectors 120 are accessible in the front face 104 for connecting to the remote measuring member 400.

Figure 3:
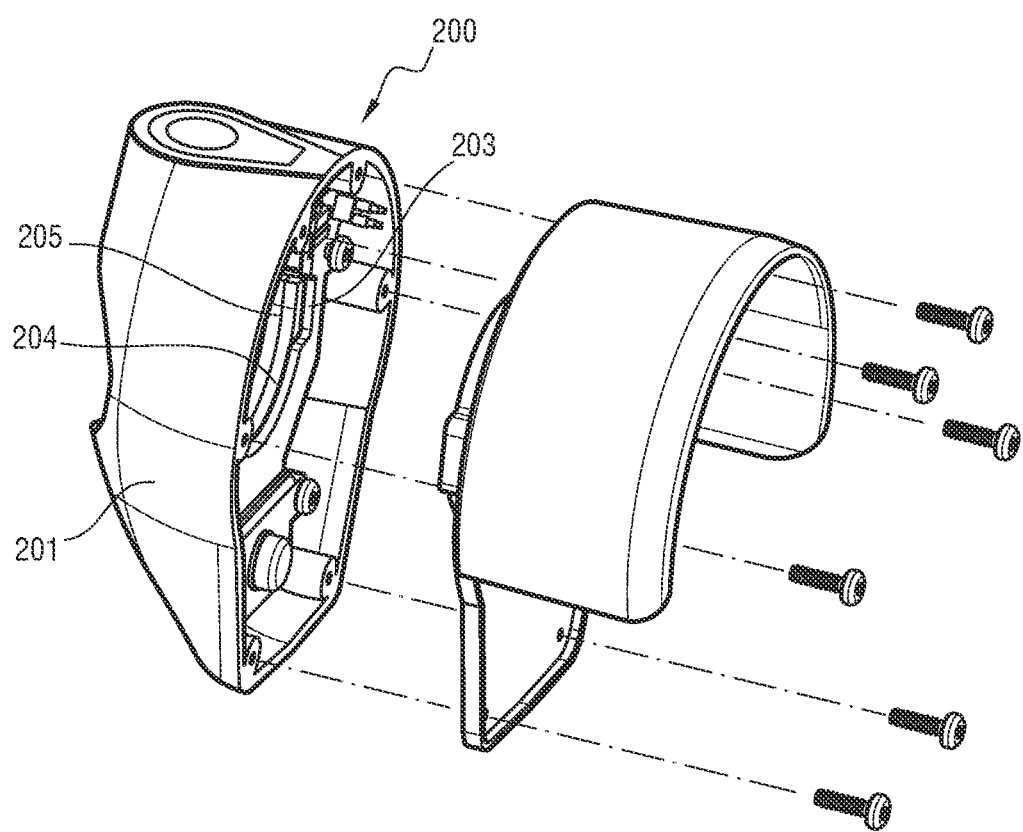
FIG. 3 is an exploded perspective view of a first grip member of the interface body.
Figure 4:
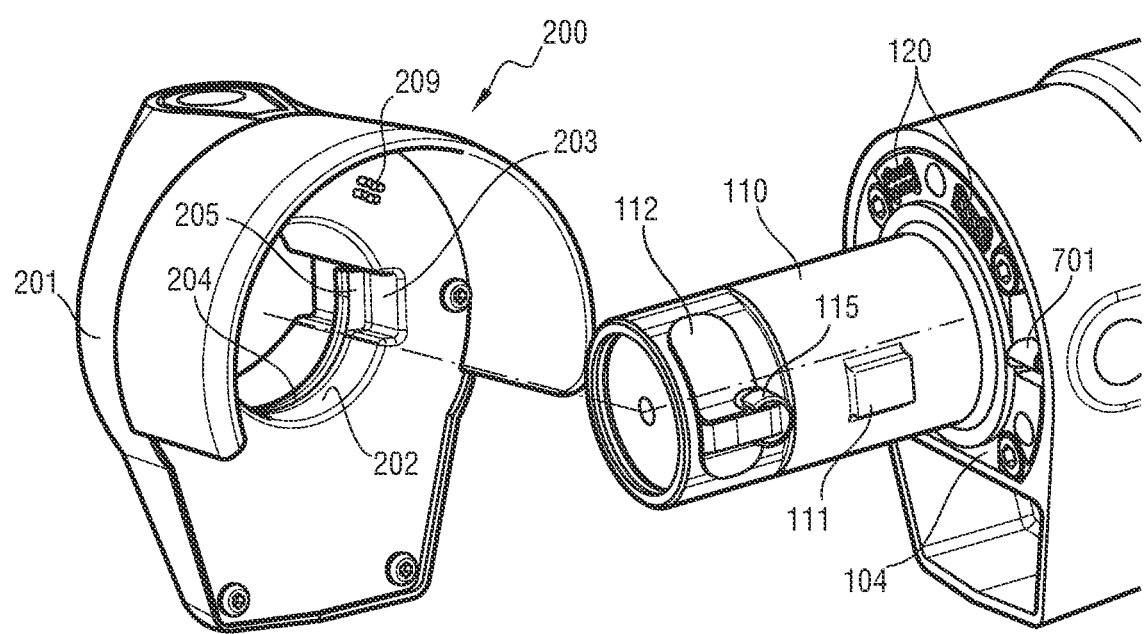
FIG. 4 is a perspective view of the first grip member and of the interface body before mounting.

With reference more particularly to FIGS. 3 and 4, the first grip member 200 comprises an annular grippable body 201 having a central cylindrical duct 202 enabling the annular grippable body 201 to be engaged on the tubular coupling part 110 so that the annular grippable body 201 extends over the front surface 104 and the electrical connectors 120. The central cylindrical duct 202 is provided with two axial grooves 203 for receiving the external projections 111.

A retaining element 204 is mounted on the annular grippable body 201 to slide transversely relative to the tubular coupling part 110. The retaining element 204 is in the shape of a fork with two branches 205 and it is mounted on the annular grippable body 201 between:

a retaining position in which the branches 205 have respective portions projecting into the axial grooves 203 in order to be engaged behind the external projections 111 so as to press the annular grippable body 201 against the front face 104; and a release position in which the branches 205 have respective notches coinciding with the axial grooves 203 so as to allow the external projections 111 to pass through. The branches 205 have wedge-forming surfaces so as to hold the annular grippable body 201 clamped against the front face 104. The retaining element 204 is held in each of its positions by a ball that is mounted in a housing of the retaining element 204 to be movable between a retracted position inside the housing and a projecting position into which it is urged resiliently and in which it projects from the housing. The annular grippable body 201 is provided with two setbacks positioned to receive the projecting ball respectively when the retaining element 204 is in its release position and in its retaining position. In a variant, it is possible merely to provide a spring mounted between the annular grippable body 201 and the retaining element 204 so as to urge the retaining element 204 resiliently into its retaining position.

The annular grippable body 201 has an outside surface front portion 206 that is curved and an outside surface side portion 207 in which at least one button 208 is accessible for actuating a switch received inside the annular grippable body 201. The switch is connected to a connector 209 carried by the annular grippable body 201 so as to be connected to one of the electrical connectors 120 when the annular grippable body 201 is pressed against the front face 104. The outside surface front portion 206 is substantially in the shape of a spherical cap. It should be observed that the connectors 209 and 120 being connected together makes it possible to detect that the annular grippable body 200 is present. It is thus possible, in all or part of a measurement protocol, to prevent points being measured if the annular grippable body 200 is not mounted.

Figure 5A:
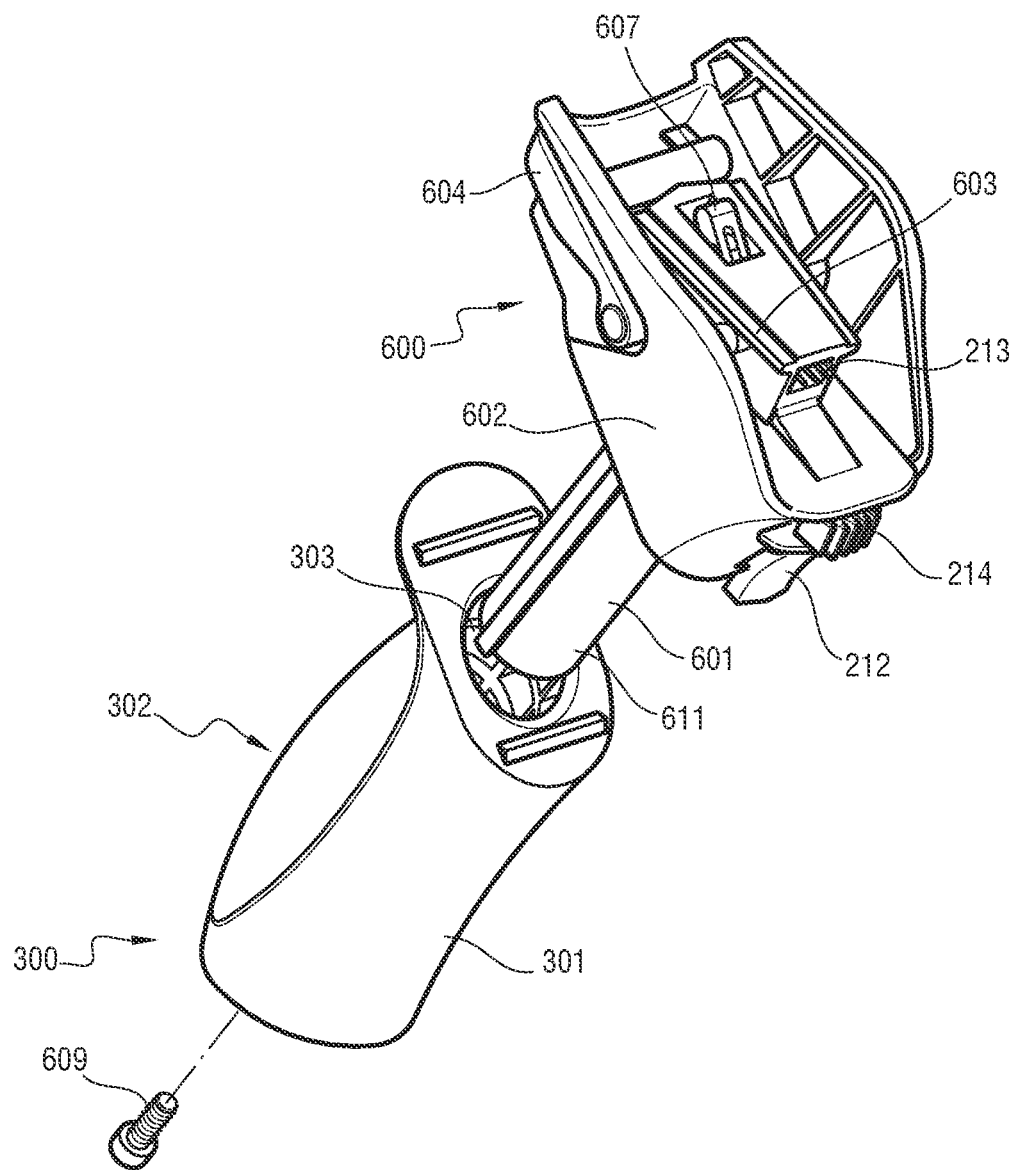
FIG. 5a is an exploded perspective view of a second grip member of the interface body.
Figure 5B:
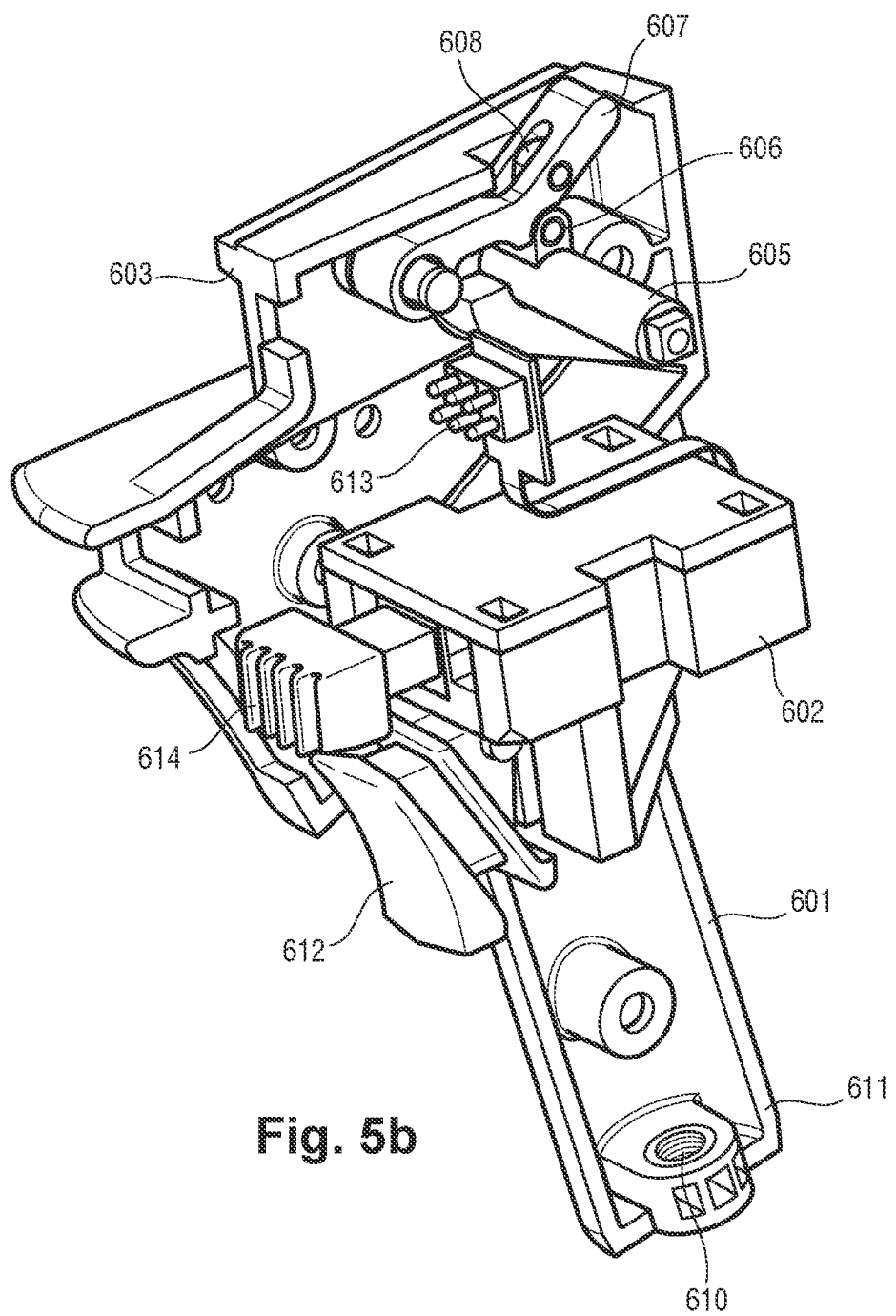
FIG. 5b is a fragmentary perspective view of the fastener support of the second grip member.
Figure 6:
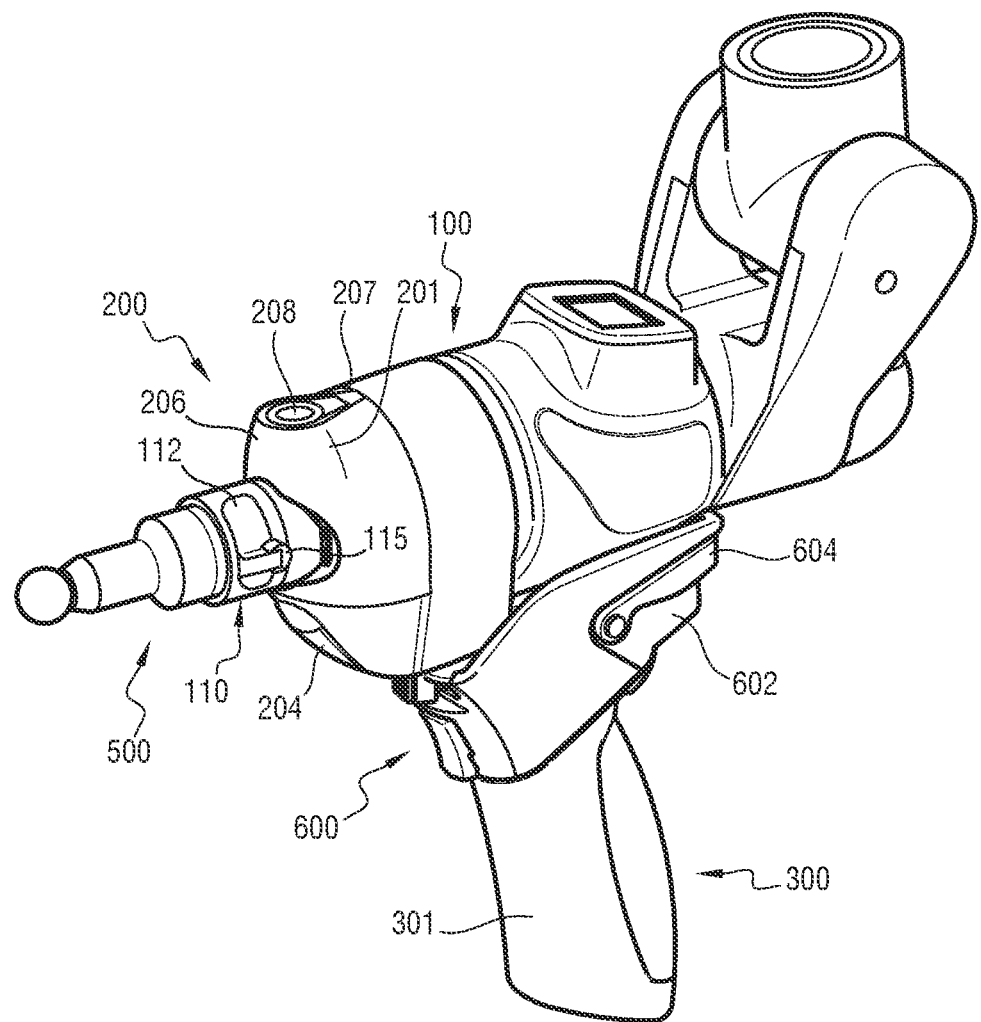
FIG. 6 is a perspective view of the interface body fitted with two grip members and with a first measuring member.
Figure 7:
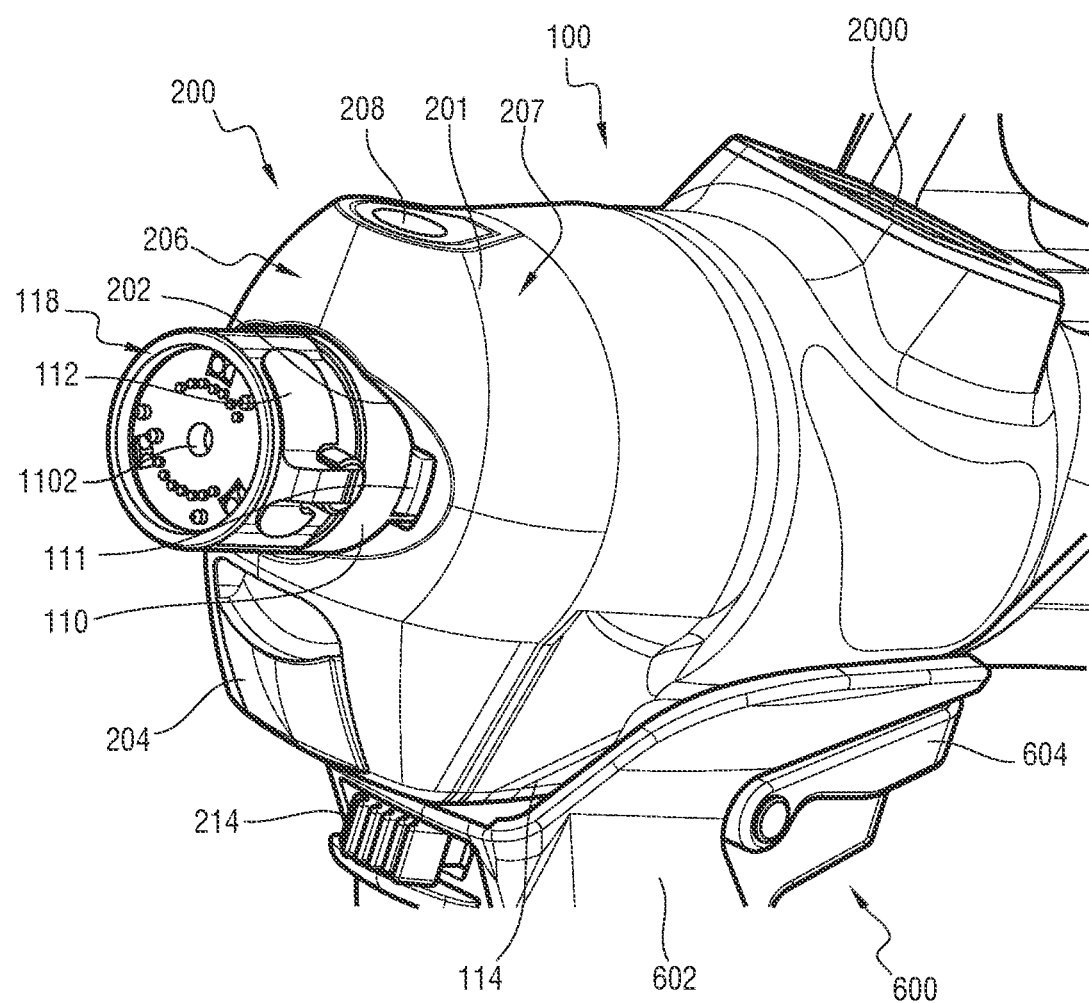
FIG. 7 is a detailed view of FIG. 6 before putting the first measuring member into place.
Figure 8:
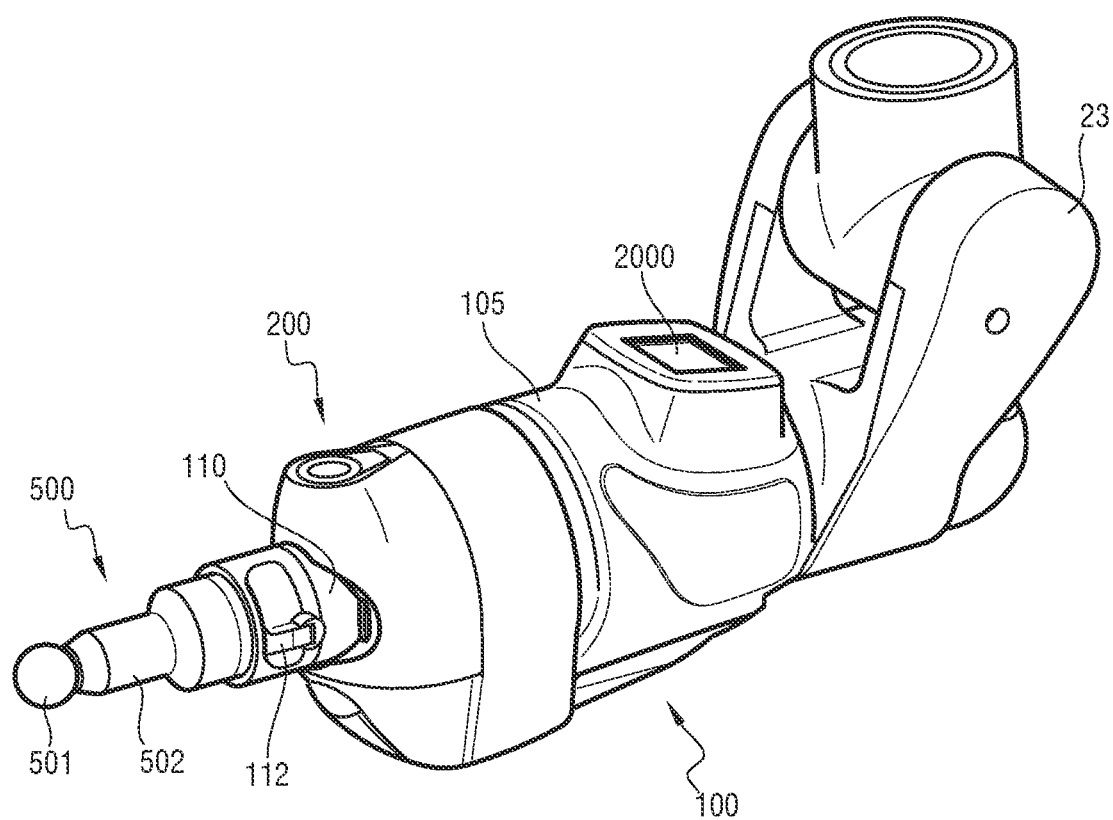
FIG. 8 is a perspective view of the interface body fitted with the first grip member only and with the first measuring member.
Figure 9:
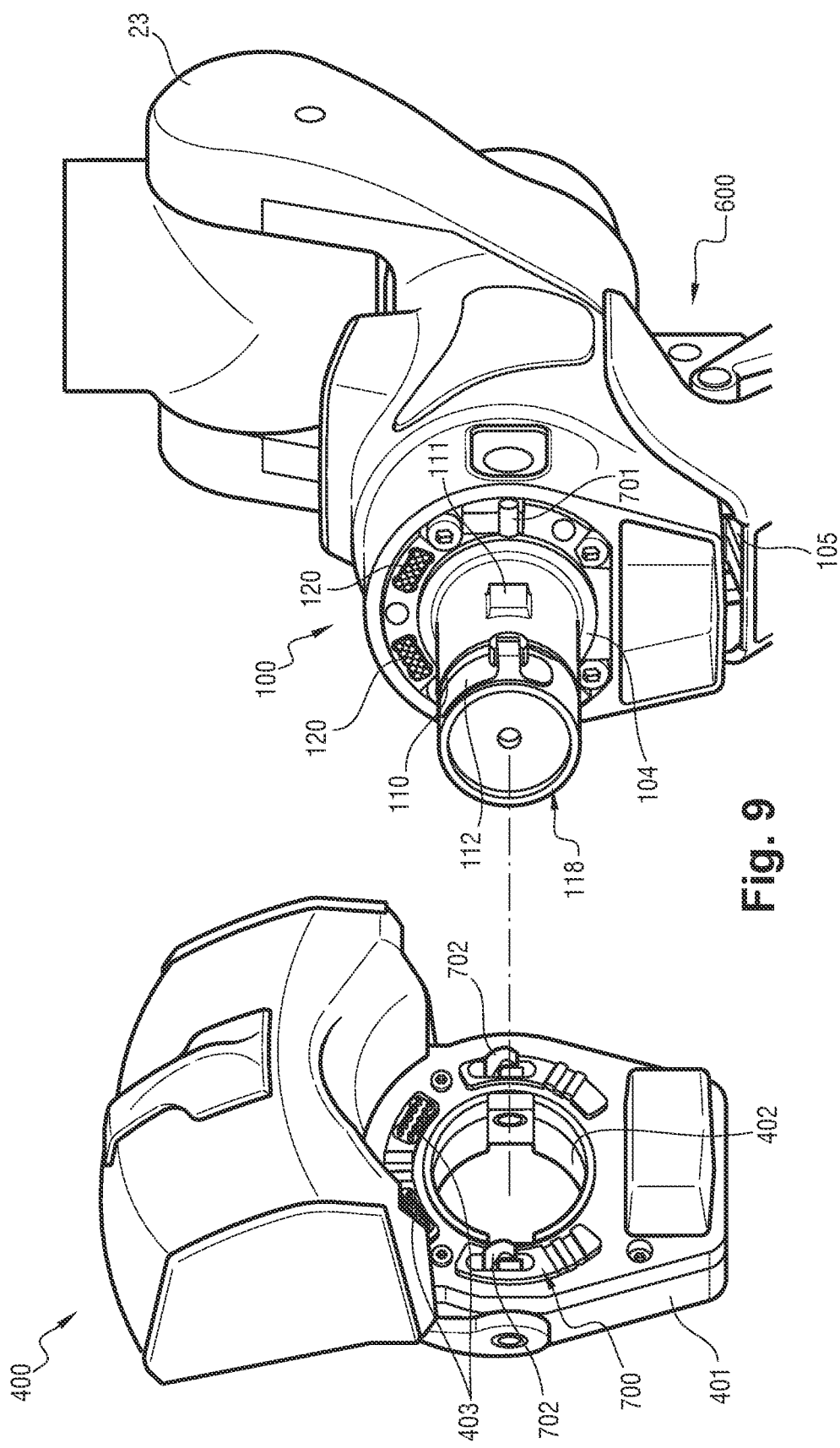
FIG. 9 is a perspective view of a second measuring member and of the interface body before mounting.
Figure 10:
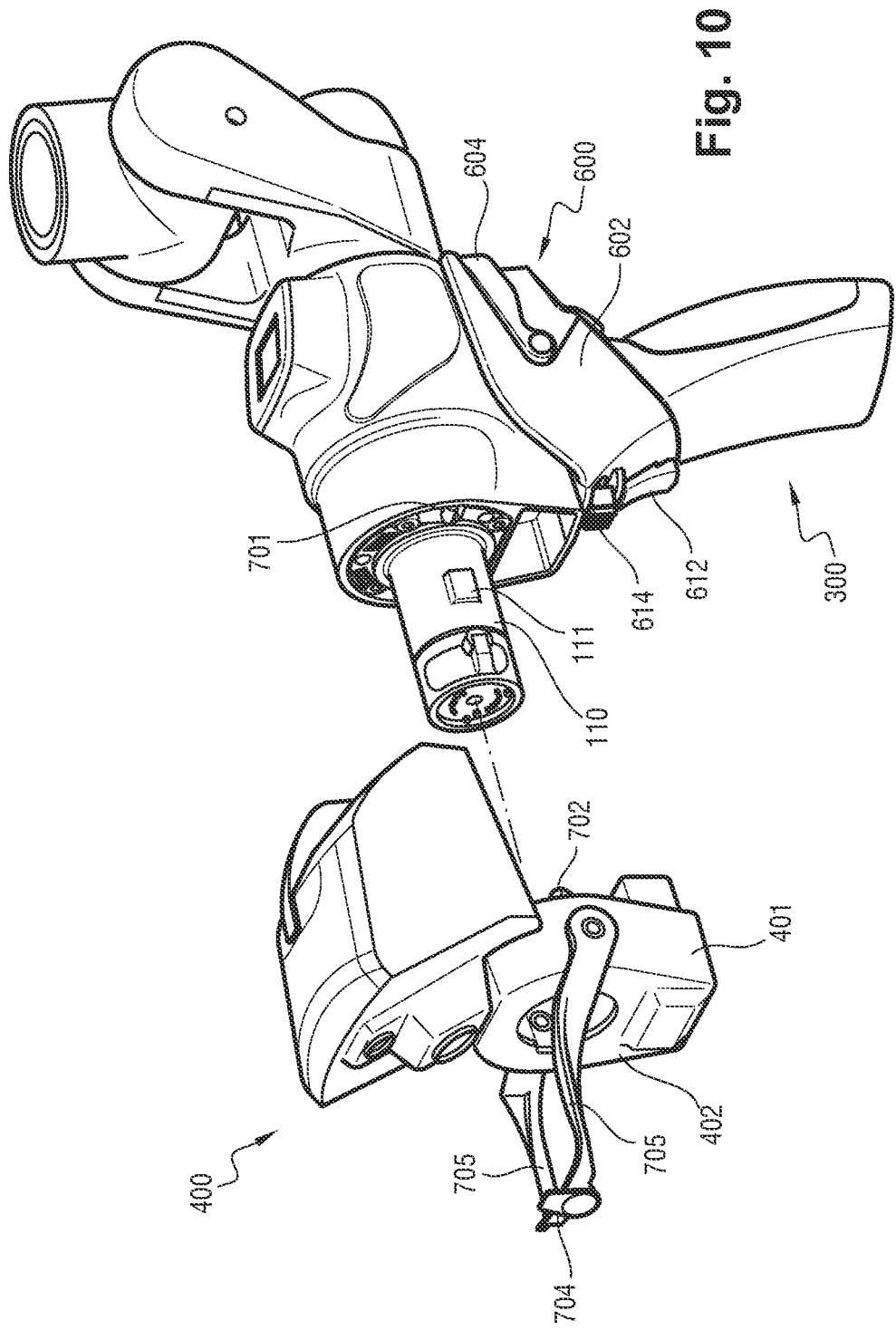
FIG. 10 is a perspective view of the second measuring member and of the interface body while they are being mounted on the free end of the arm.
Figure 11:
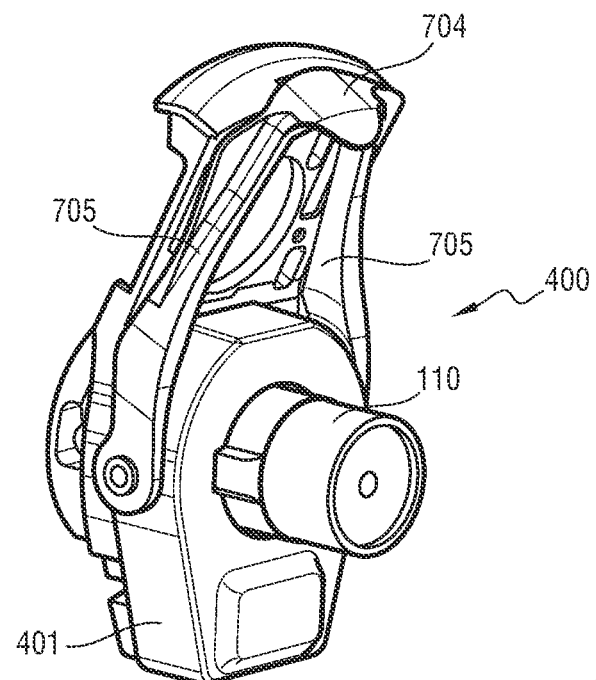
FIG. 11 is a perspective view of the assembly mechanism for assembling together the second measuring member and the interface body.
Figure 12A:
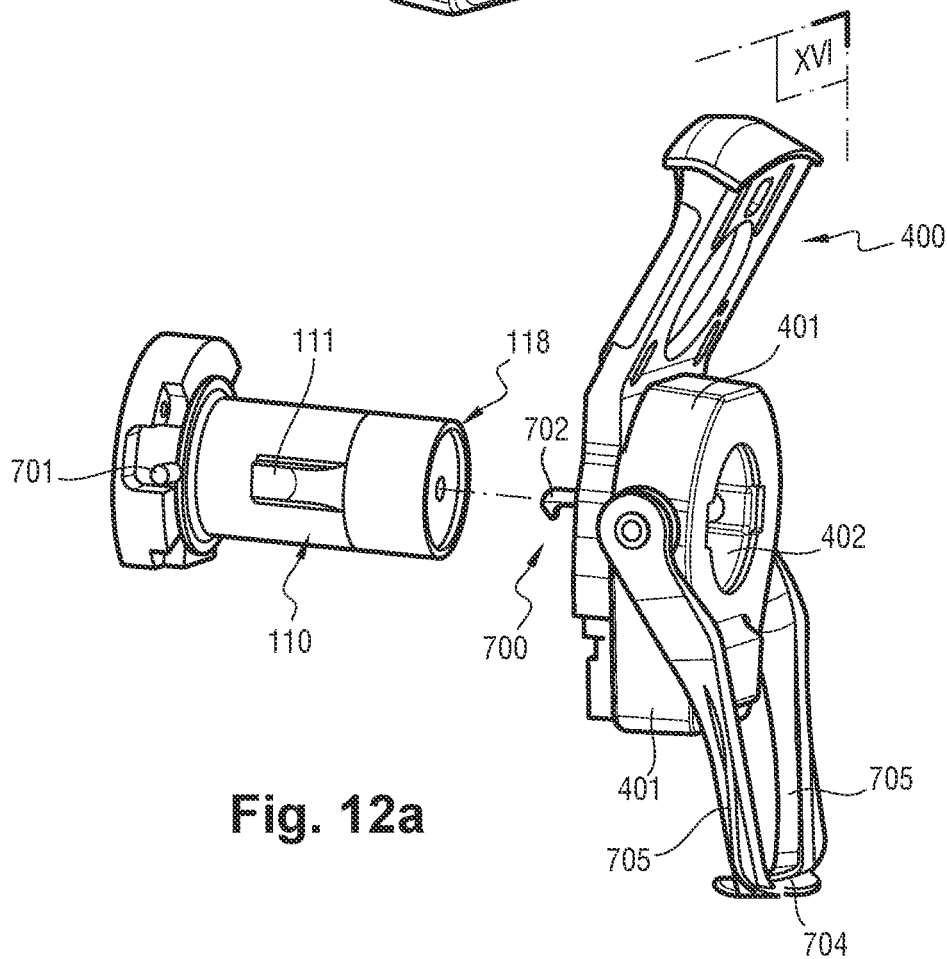
FIGS. 12 a, b, c, d, and e show the coupling and uncoupling operations.
Figure 12B:
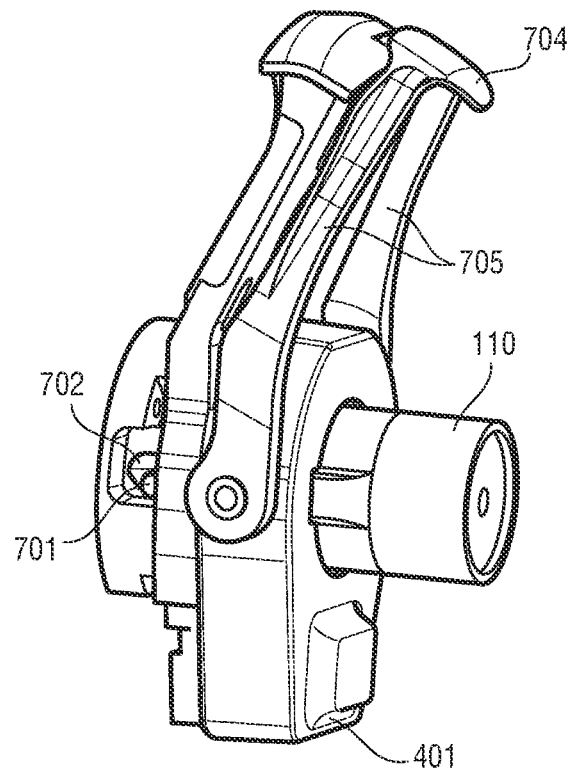
Figure 12C:
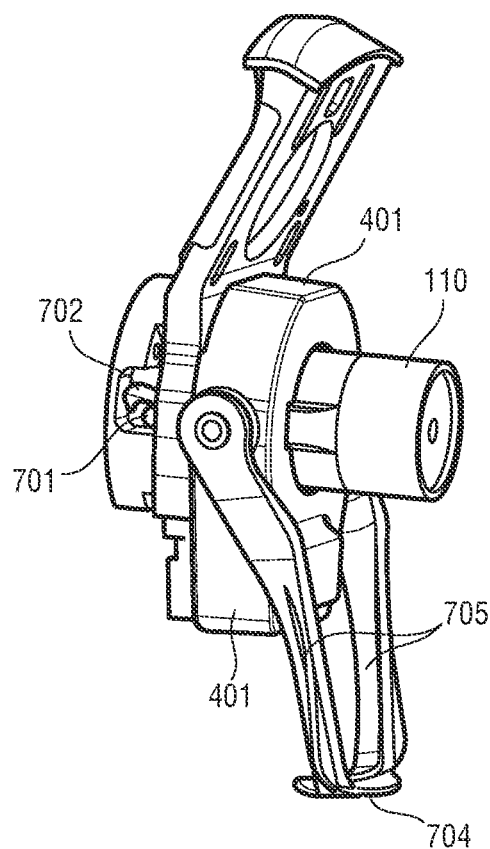
Figure 12D:
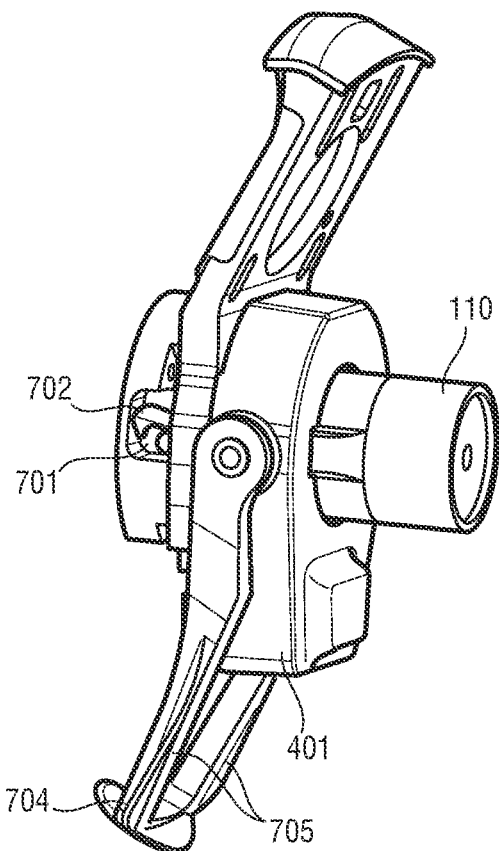
Figure 12E:
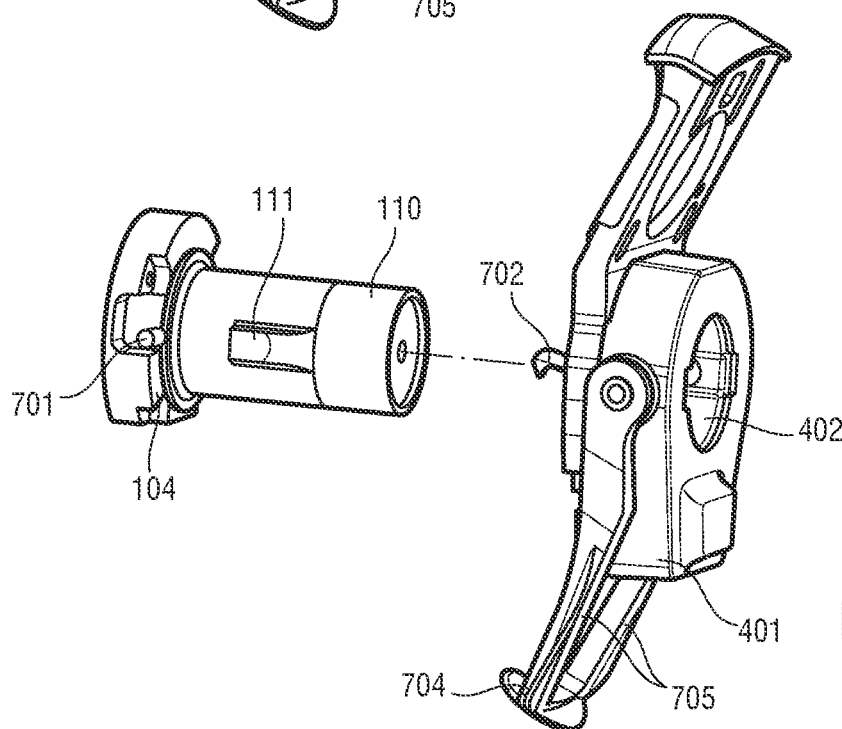

With reference more particularly to FIGS. 5a, 5b, and 6, the second grip member 300 has a handle 301 of "pistol-grip" type. The handle 301 is secured to a fastener base 600 having a reinforcing appendix 601 on which the handle 301 is engaged, and an end portion 602 having a slideway 603 that extends transversely relative to a longitudinal direction of the reinforcing appendix 601 in order to co-operate with a slideway 114 of the side surface 105 of the interface body 100. The interface body 100 and the end portion 602 of the fastener support 600 include complementary abutment means so as to define a position in which the slideways 603 and 114 are mutually engaged, and complementary locking means opposing disengagement of the slideways 603 and 114. The complementary locking means comprise a control lever 604 that is hinged on the end portion 602 of the fastener base 600 between an activation position for activating the locking means and an inactivation position for inactivating the locking means. The control lever 604 is U-shaped with two branches having their free ends secured to respective ends of a shaft 605 that is provided with a lug 606 and that is pivotally mounted on the end portion 602 of the fastener base 600. The fastener support 600 is provided with a rocker latch 607 having a first end pivotally mounted in the end portion 602 so as to have a second end that is movable between a retracted position and a projecting position projecting from the end portion 602. A link 608 is hinged at one end to the lug 606 and at the other end to the rocker latch 607 in such a manner that when the control lever 604 is in its activation position, the rocker latch 607 is in its projecting position to co-operate with an abutment of the side surface 105 of the interface body 100 and opposes disengagement of the slideways 603 and 114, and when the control lever 604 is in its deactivation position, the rocker latch 607 is in its retracted position away from the abutment and allows the slideways 603 and 114 to be disengaged.

The handle 301 is tubular in shape with a grippable outside surface 302 and an inside surface 303 defining a housing in which the reinforcing appendix 601 is engaged. The handle 301 is fastened on the reinforcing appendix 601 of the fastener base 600 by at least one screw 609 passing through an end wall of the handle 301 to be engaged in a tapped hole 610 in a free end portion 611 of the reinforcing appendix 601 of the fastener base 600 extending facing the end wall. The device of the invention advantageously includes a set of interchangeable handles 301 of different outside dimensions adapted to hands of different sizes.

Said end portion 602 of the fastener base 600 includes both an acquisition control button 612 (in the form of a trigger) for actuating a switch that is electrically connected to a connector 613 for connection to a connector that is accessible in the side surface 105 and that is electrically connected to the electronic acquisition unit 1000, and also a multidirectional selector button 614 for actuating a switch that is also electrically connected to the connector 613. The handle 301 itself does not have any electronic circuit portion or an electronic component. The same applies to the reinforcing appendix 601.

With reference more particularly to FIG. 15, the contact measuring member 500 comprises a touch probe 501 carried by a male cylindrical portion 502 engaged in a tubular coupling part 110 secured to the interface body 100. The male cylindrical portion 502 and the tubular coupling part 110 form two separable portions of a coupling interface. The tubular coupling part 110 is provided with a locking mechanism, given overall reference 1100, for locking the coupling and comprising a tab 112 formed by a curved plate and carried by a pin 115 mounted on the tubular coupling part 110 to pivot about a radial direction of the tubular coupling part 110 between a retaining position for retaining the male cylindrical portion 502 and a release position for releasing the male cylindrical portion 502. The tab 112 is also mounted on the tubular coupling part 110 to pivot between a position in which it is pressed against an outside surface 113 of the tubular coupling part 110 and a raised position enabling it to be handled.

Figure 21:
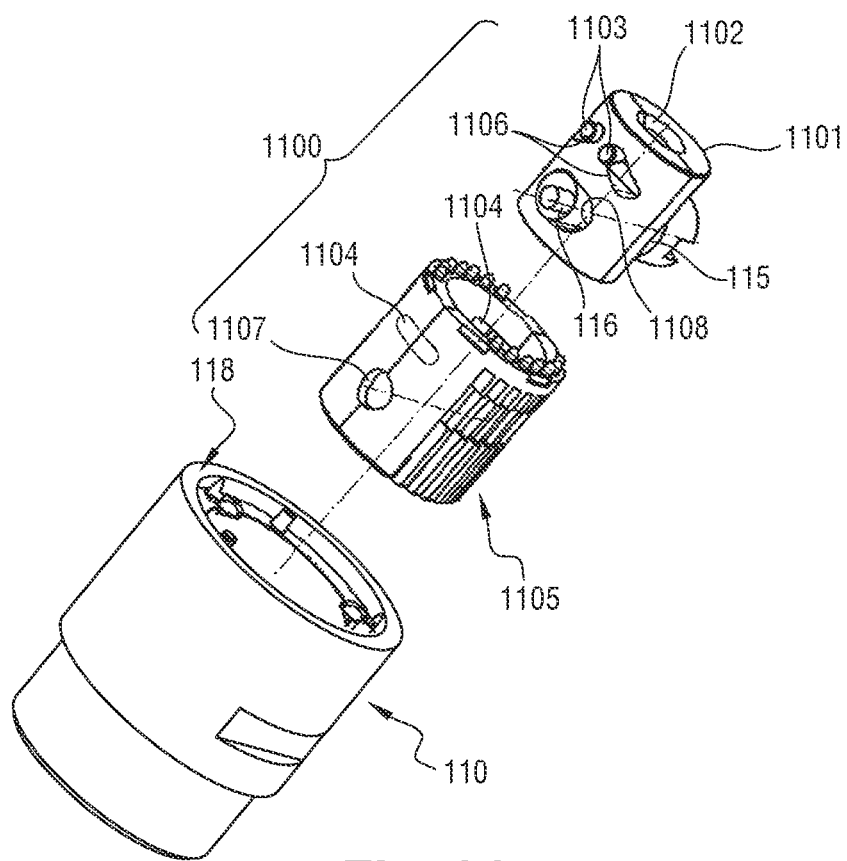
FIG. 21 is an exploded perspective view of a coupling interface, and more particularly of a tubular coupling part, of the first measuring member.
Figure 22:
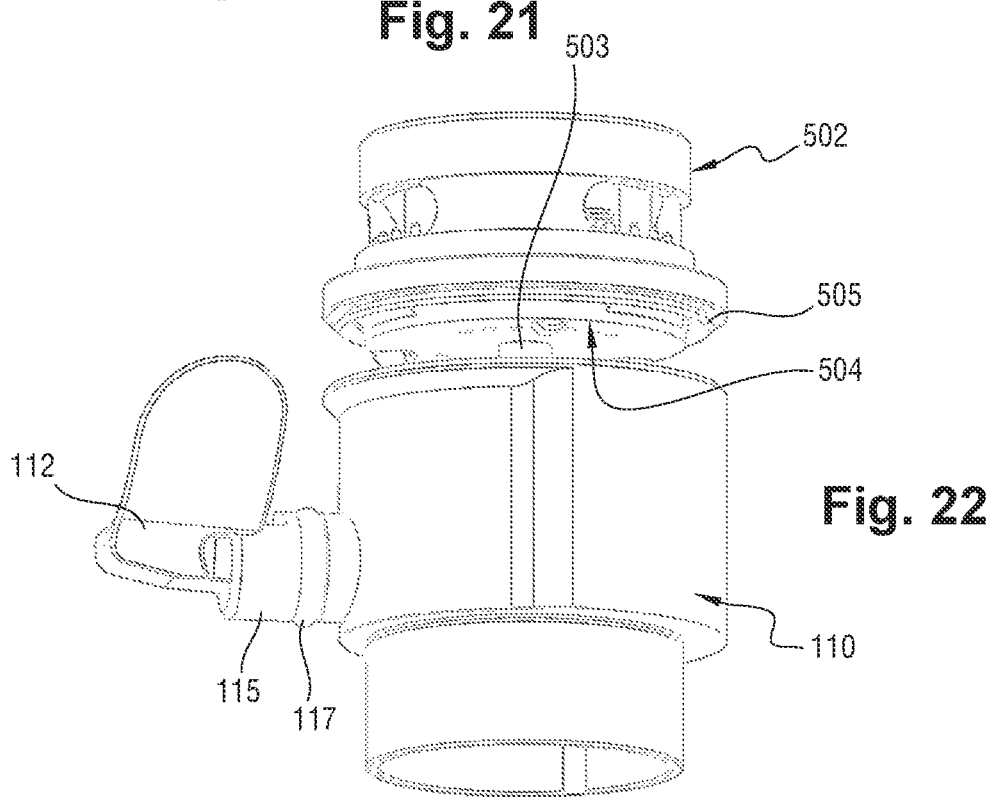
FIG. 22 is a perspective view of this coupling interface.

With reference more particularly to FIGS. 20 to 22, in this example the locking mechanism 1100 housed in the tubular coupling part 110 is of the same type as that described in document U.S. Pat. No. 7,282,017. The locking mechanism 1100 comprises a slider 1101 defining a reception housing 1102 for receiving a stem 503 of the male cylindrical portion 502 and two pins 1103 (although one would suffice) extending facing each other on either side of the housing 1102. The pins 1103 have mutually parallel axes that are contained in a common plane transverse to the housing 1102, and they are mounted in the slider 1101 to be movable between a locking position in which the pins 1103 have respective central portions projecting into the housing 1102, and an unlocking position in which the central portions of the pins 1103 are retracted out from the housing 1102. The pins 1103 have ends that are received in two transverse grooves 1104 made in diametrically opposite positions in the inside surface of an insert 1105 fastened in the tubular coupling part 110. The insert 1105 comprises two portions touching each other along a join plane containing the central axis of the tubular coupling part 110, said portions being symmetrical about the join plane, and each portion including a respective one of the grooves 1104 for receiving the ends of the pins 1103. Each pin 1103 also possesses two intermediate portions each extending between a respective one of the ends of said pin and the central portion of said pin, and received in respective slots 1106 formed in the slider 1101 so as to extend in sloping manner relative to the central axis of the tubular coupling part 110. The slider 1101 is mounted in the insert 1105 to slide parallel to the central axis of the tubular coupling part 110 between the first and second positions, and the slope of the slots 1106 is determined so that moving the slider 1101 from its first position to its second position causes the pins 1103 to move from their locking positions to their unlocking positions, and vice versa. The pin 115 having the tab 112 secured to one of its ends has an opposite end that is engaged in a hole 1107 formed in the insert 1105. Between its two ends, the pin 115 has an off-center portion received in a groove 1108 formed in the slider 1101 to extend transversely to the central axis of the tubular coupling part 110 in such a manner that pivoting the tab 112 from its retaining position to its release position causes the slider 1101 to move from its first position to its second position, and vice versa. The pin 115 of the tab 112 passes through the wall of the tubular coupling part 110 and through the insert 1105, and it possesses a groove fitted with an annular sealing gasket 117 that co-operates with the wall of the tubular coupling part 110 to provide sealing between them.

The male cylindrical portion 502 has a transverse face 504 from which there projects the stem 503 that is to be inserted into the housing 1102 of the slider 1101 and that is provided with two notches to receive the central portions of the pins 1103 when they are in their locking position. The transverse face 504 is provided with a sealing gasket 505 in the form of a peripheral elastomer lip that projects from said transverse face 504 so as to be deformed and pressed against a plane annular surface 118 of the free end of the tubular coupling part 110, thereby providing sealing between the tubular coupling part 110 and the male cylindrical portion 502. In this example, the sealing gaskets 117 and 505 are arranged to comply with the IP54 standard. It should be observed that the ability to fold down the tab 112 onto the tubular coupling part 110 presents three advantages. Specifically, when it is in the folded-down position, the tab 112:

does not impede handling of the interface body 100 for performing measuring operations;

does not impede installation of the first grip member 200 or of the second measuring member 400 for remote measuring; and opposes turning about the radial direction of the tubular coupling part (the curved portions of the tab 112 come into abutment against the outside surface of the tubular coupling part).

The remote measuring member 400 comprises a frame 401, an optical sensor, and a projector for projecting a light pattern. The remote measuring member 400 is for pointing at a zone of the object that is to be measured in order to project the light pattern thereon and take an image. The operating principle of the remote measuring member 400 is itself known and is not described in detail herein.

With reference more particularly to FIGS. 11 to 13 and 16, the frame 401 of the remote measuring member 400 includes an orifice 402 for passing the tubular coupling part 110 and connectors 403 for being electrically connected to the connectors 120 of the interface body 100. The frame 401 is designed to be connected to the interface body 100 by a fastener mechanism 700 that can be selectively controlled to occupy a snap-fastening state (FIGS. 12a, 12c, 13c) in which the remote measuring member 400 is held on the interface body 100 while the connectors 403 and 120 are disengaged from each other, a locking state (FIGS. 11, 12b, 13a) in which the remote measuring member 400 is fastened to the interface body 100 and the connectors 403 and 120 are engaged in each other, and a release state (FIGS. 12d, 12e, 13b) in which the remote measuring member 400 can be separated from the interface body 100.

The fastener mechanism 700 has two projections 701 arranged symmetrically on either side of the tubular coupling part 110 and each formed by a bar passing through a housing formed in the front face 104.

The locking mechanism has two hooks 702 mounted on the frame 401 of the remote measuring member 400 symmetrically on either side of the orifice 401 to tilt about a tilt axis A1 between a locking position and an unlocking position. Between each hook 702 and the frame 401, there extends a resilient return element 703 for urging the hook 702 towards the locking position.

Figure 13A:
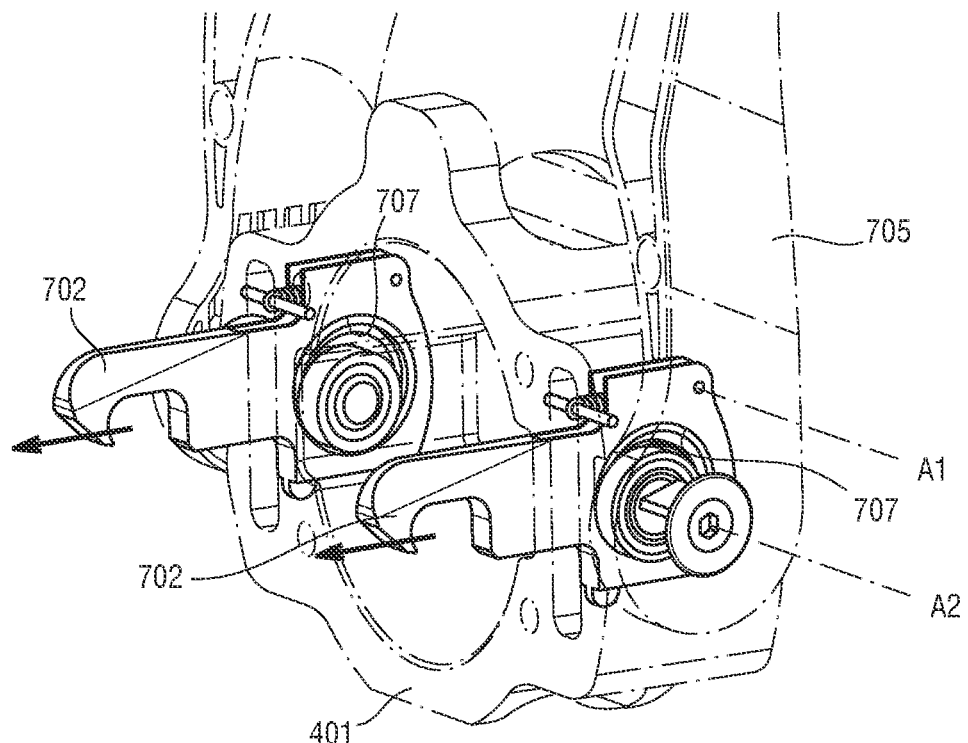
FIGS. 13 a, b, and c show in transparency the various positions of the portion of the assembly mechanism carried by the second measuring member.
Figure 13B:
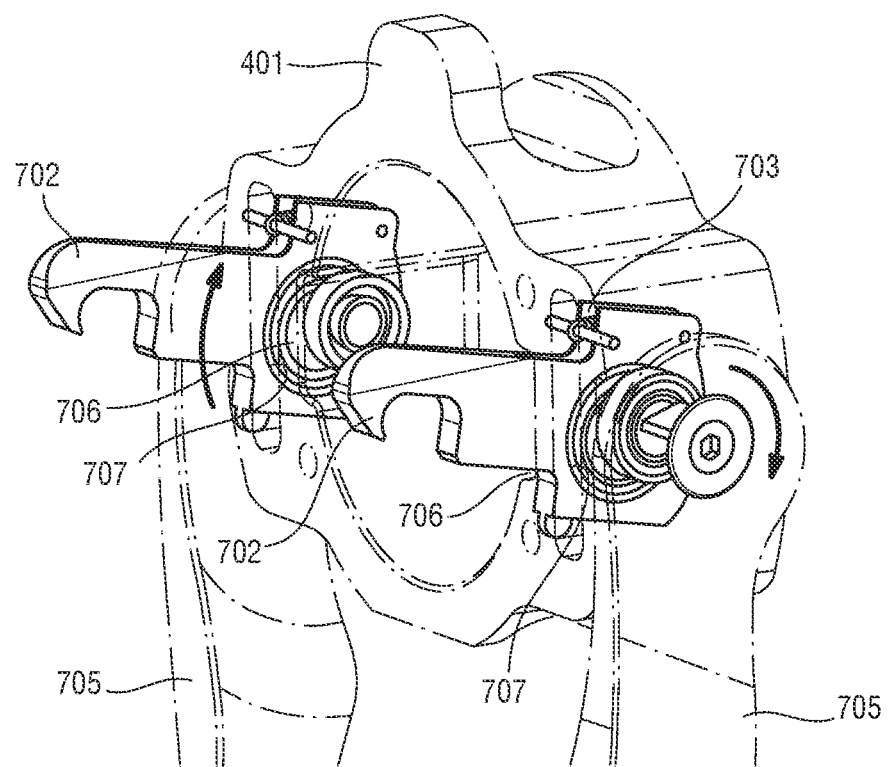
Figure 13C:
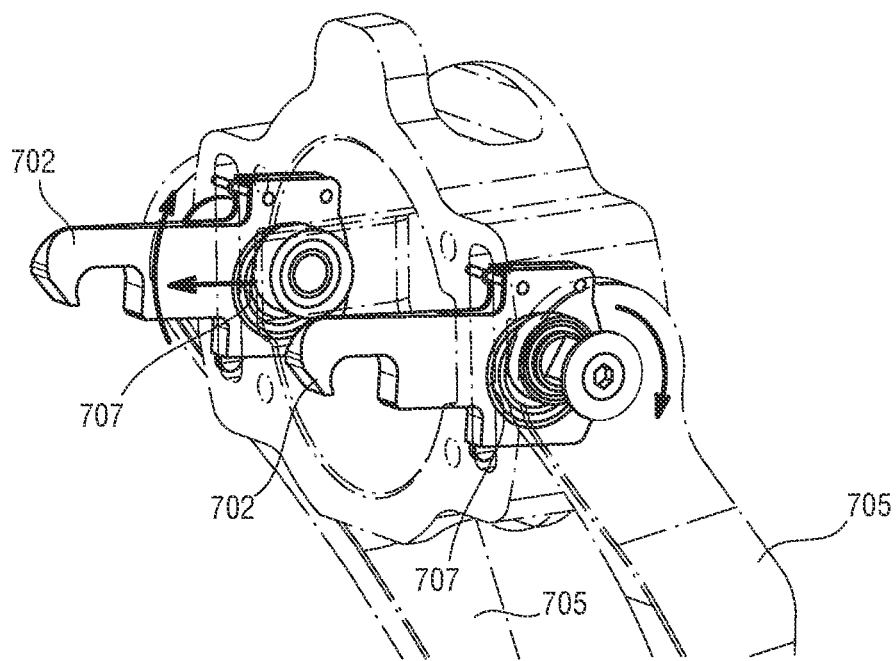
Figure 14:
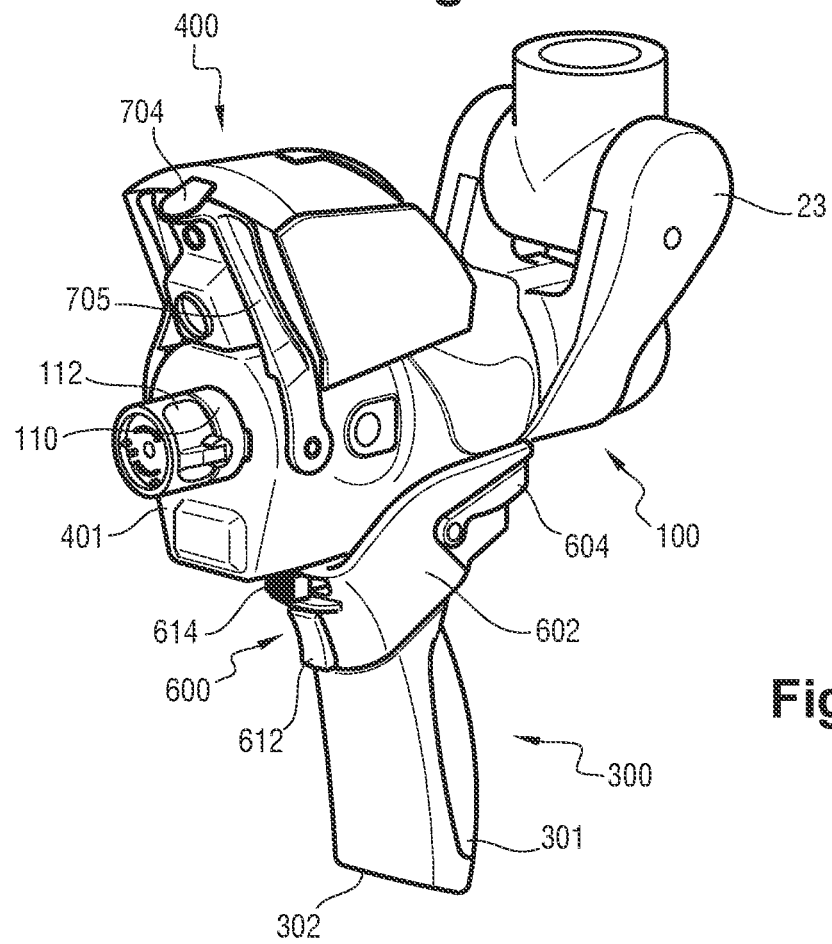
FIG. 14 is a perspective view of the second measuring member mounted on the free end of the arm.

The hooks 702 of the locking mechanism 700 are controlled by a lever 704 in the shape of a fork with branches 705, each having a free end hinged to the frame 401 of the remote measuring member 400. The free end of each branch 705 of the lever 704 is hinged to the remote measuring member 400 about a pivot axis A2 distinct from the tilt axis A1 of the hook 702 and that is constrained to rotate with an eccentric 706 received in a housing 707 of the hook 702 in such a manner that:

when the lever 704 is in a locking position (FIG. 12b), each eccentric 706 bears against a bottom surface of the housing 707 and holds the hook 702 in its locking position (FIG. 13a);

when the lever 704 is in an unlocking position (FIGS. 12d, 12e), each eccentric 706 bears against a top surface of the housing 707 and holds the hook 702 in its unlocking position (FIG. 13b); and when the lever 704 is in a snap-fastening position (FIGS. 12c, 13c), each eccentric 706 is in the top portion of the housing 707 so as to avoid impeding movement of the hook between its two positions so as to leave the hook 702 in a snap-fastening state. In this state, the hook is free to be moved between its two positions (FIG. 13c).

The snap-fastening position of the lever 704, i.e. its position corresponding to the snap-fastening state, is situated between the other two positions of the lever 704.

Figure 17:
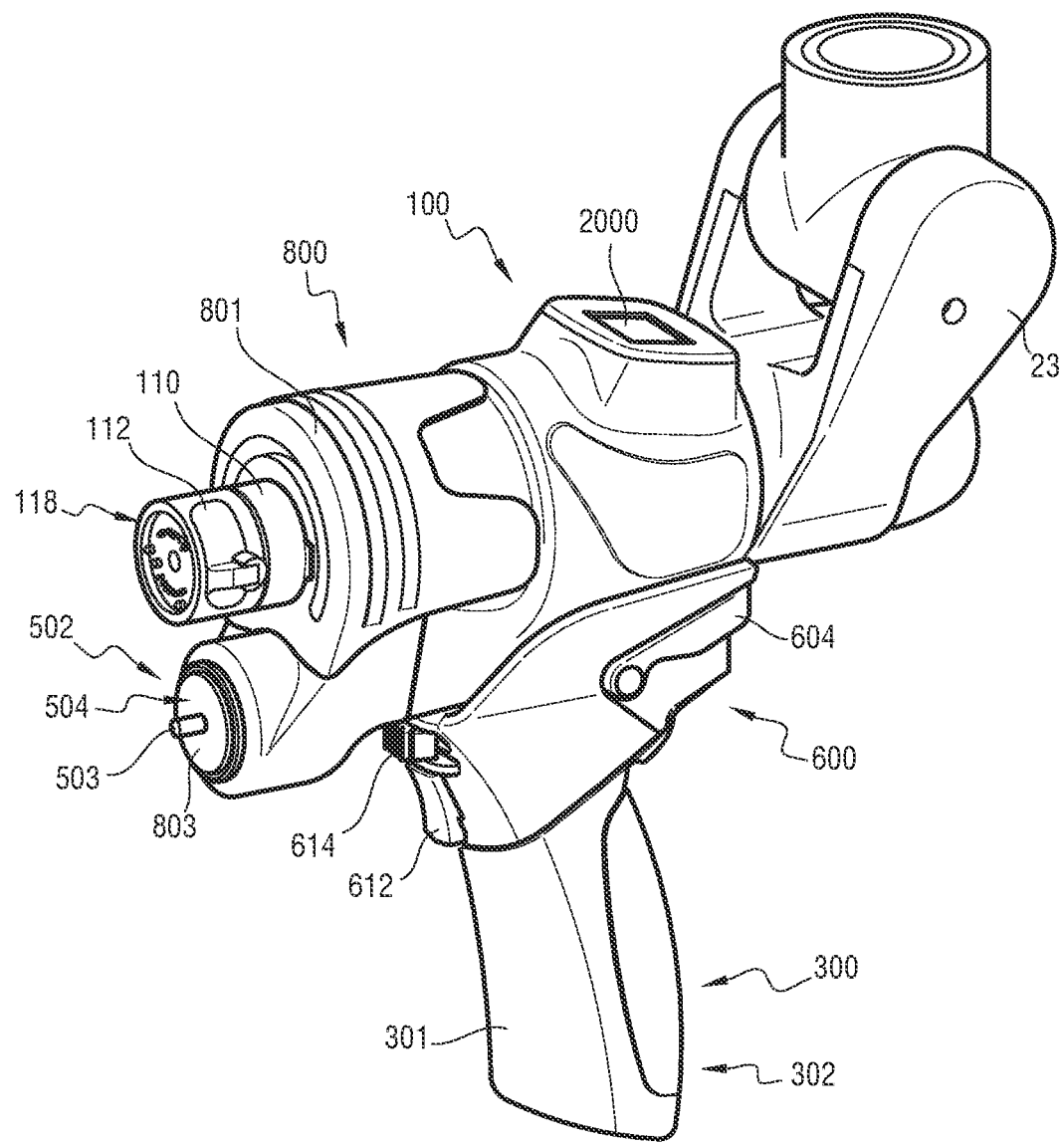
FIG. 17 is a perspective view of the interface body fitted with an adapter support for carrying a third measuring member.
Figure 18:
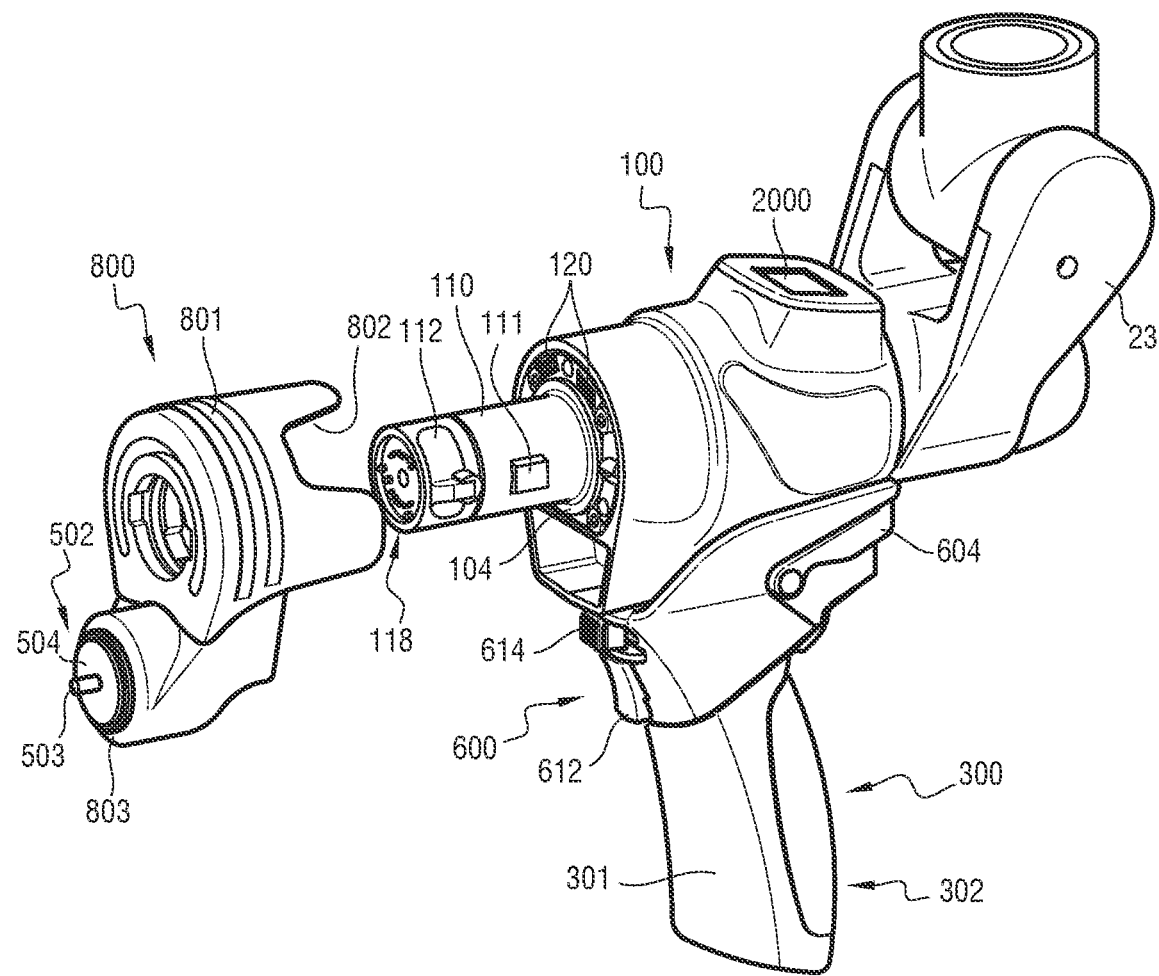
FIG. 18 is a perspective view of the interface body with the adapter support for carrying a third measuring member while it is being mounted.
Figure 19:
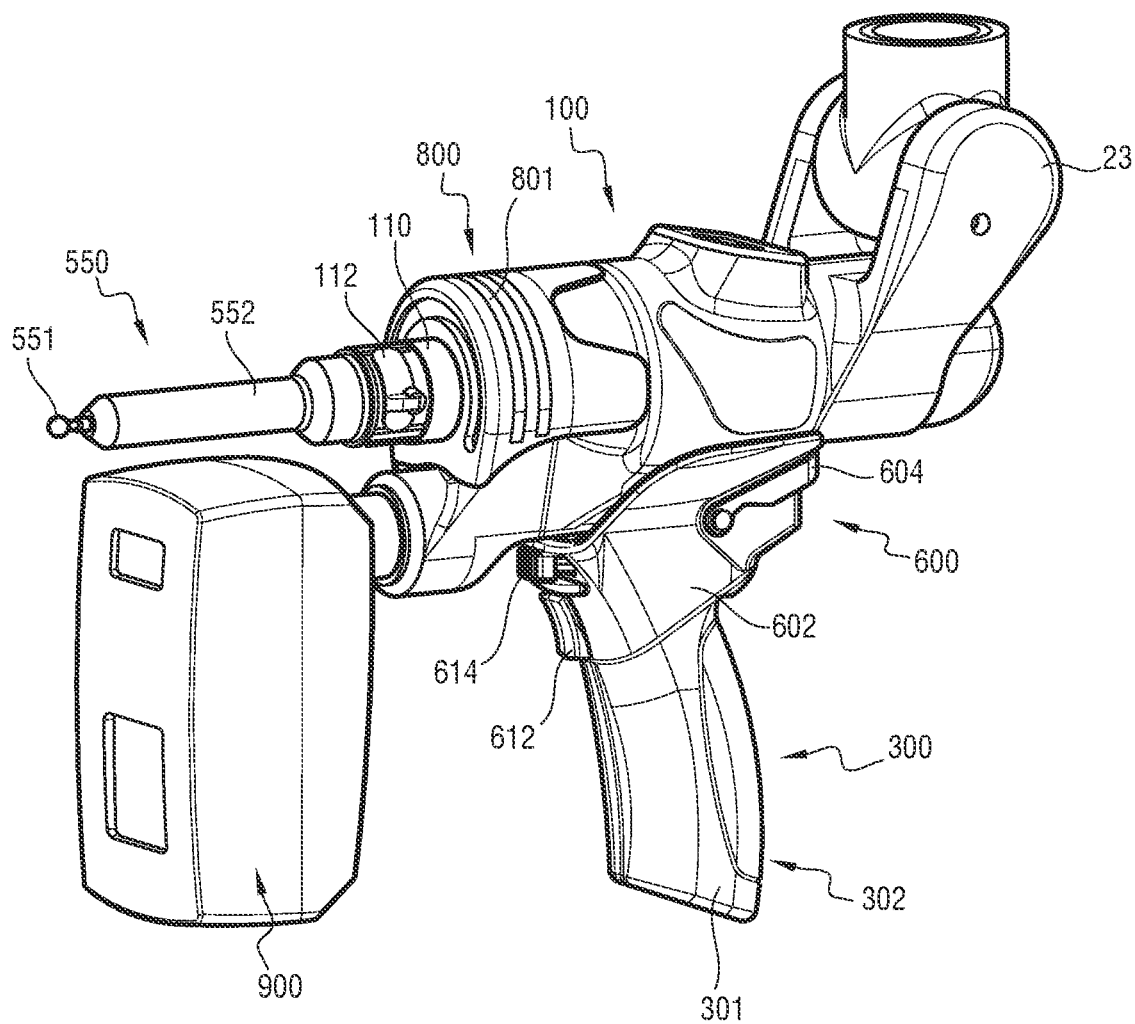
FIG. 19 is a perspective view of the interface body fitted with the adapter support, the third measuring member, and a fourth measuring member.

With reference more particularly to FIGS. 17 to 19, the measuring device includes a fastener support 800 for fastening a third measuring member 900. In this example, the third measuring member 900 is a contactless measuring member provided with a battery and with wireless connection means for connection with the electronic acquisition unit 1000. In a variant, it is possible to provide an external wired link between the third measuring member 900 and the electronic acquisition unit 1000. The operating principle of the remote measuring member 900 is itself known and is not described in detail herein.

The fastener support 800 comprises a body 801 having two housings 802 and 803 made therein and opening out into opposite faces of the body 801. In this example, the fastener support 800 is fastened to the interface body by using a mechanism similar to that used for fastening the grip body 200. The housing 802 is of dimensions such that an end wall of the housing 802 can be pressed against the front face 104, and the side walls of the housing 802 cover a portion of the outside surface of the interface body 100 adjacent to the front face 104. The housing 803 is of dimensions suitable for enabling a portion of a connector to be fastened thereto for connecting to the third measuring member 900. In this example, the housing 803 is provided with a male portion analogous to the male portion 502 that co-operates with the tubular coupling part 110, while the third measuring member is provided with a tubular coupling part identical to the tubular coupling part 110. In operation, the operating support 800 is positioned so that the third measuring member 900 extends under the tubular coupling part 110 so that the assembly constituted by the interface body 100, the fastener support 800, and the third measuring member 900 is more comfortable for the operator to handle.

It can be seen in FIG. 19 that the measuring device is fitted with a fourth measuring member that is a contact measuring member 550 comprising a touch probe 551 carried by a male cylindrical portion 552 engaged in the tubular coupling part 110 secured to the interface body 100. The contact measuring member 550 takes the place of the contact measuring member 500 when it is desired to take measurements both by contact and also by means of the third measuring member 900. The contact measuring member 550 is characterized in that it is longer than the contact measuring member 500 so that the touch probe 551 can be put into contact with the object that is to be measured while limiting any risk of contact between the third measuring member 900 and said object that is to be measured.

It should be observed that, in the preferred embodiment described herein, the device of the invention has six main characteristics:

1) the measuring member is connected to the interface body by a fastener mechanism that is controllable by a lever and that is arranged in such a manner that the lever controls the fastener mechanism to occupy selectively a snap-fastening state in which the measuring member is held on the interface body while the connectors are disengaged from each other, a locking state in which the measuring member is fastened to the interface body and the connectors are engaged with each other, or a release state in which the measuring member can be separated from the interface body;

2) the handle is tubular in shape with a grippable outside surface and an inside surface that defines a housing in which there is engaged a reinforcing portion of a fastener base, which portion has an end portion that projects from the handle and that is fastened to the interface body;

3) the handle is secured to a fastener base having an end portion that includes a slideway extending transversely relative to the longitudinal direction of the handle in order to co-operate with a slideway of the interface body, the interface body and the end portion of the fastener support having both complementary abutment means so as to define a mutual engagement position of the slideways and also complementary locking means that oppose disengagement of the slideways, the complementary locking means including a control lever that is hinged to the end portion of the fastener base between an activation position for activating the locking means and an inactivation position for inactivating the locking means;

4) the interface body includes a front face that has projecting therefrom a tubular coupling part for coupling to a first measuring member for measuring by contact and that is arranged to form a fastener plate for fastening either to a first grip member or else to a remote measuring member, and the interface body also includes a side surface arranged to form a second fastener plate for fastening to a second grip member;

5) the interface body has a front face in which at least one electrical connector is accessible and from which there extends a projecting tubular coupling part for coupling to the measuring member, an annular grippable body being engaged on the tubular coupling part and extending over the front surface and the electrical connector, a wedge-forming retaining element being mounted on the grippable body to slide transversely relative to the tubular coupling part and to be engaged behind an external projection of the tubular coupling part in order to hold the grippable body pressed against the front face of the interface body; and 6) the measuring member comprises a male cylindrical portion engaged in a tubular coupling part secured to the interface body, the tubular coupling part is provided with a coupling locking mechanism comprising a tab formed by a curved plate and mounted on the tubular coupling portion so as to be capable of pivoting from a position pressed against the outside surface of the tubular coupling part and a raised position enabling it to be operated.

Characteristic 1 is particularly advantageous in that it makes it easier to put the measuring member into place, which member can be relatively heavy and/or bulky. The measuring member is put into place while the mechanism is in its snap-fastening state, thereby enabling the measuring member to be attached to the interface body without the operator needing to act on the lever, merely by engaging the measuring member on the tubular coupling part until they are snap fastened. Once the measuring member is attached to the interface body, the operator can proceed with finer movements to connect the connectors and then to prevent the measuring member from moving relative to the interface body by causing the fastener mechanism to take up its locking state. The measuring member is removed by putting the fastener mechanism into its release state prior to moving the measuring member away from the interface body.

Characteristic 2 is particularly advantageous in that it allows the handle to be removed quickly, e.g. in order to be cleaned, repaired, or replaced by a handle of different dimensions. The fact of having a fastener support that is distinct from the handle also makes it possible to place a button or an electronic circuit in the top portion of the fastener support, i.e. above the handle, so that the handle itself is inexpensive and can easily be replaced.

Characteristic 3 is particularly advantageous in that it allows the grip member to be fastened relatively simply and quickly.

Characteristic 4 is particularly advantageous in that it allows for great flexibility in use of the arm of the measuring device.

Characteristic 5 is particularly advantageous in that it enables the front surface of the interface body to be used as a zone for gripping the interface body while providing the connector with protection so that it is not subjected to impacts or to soiling.

Characteristic 6 is particularly advantageous in that the plate does not impede handling of the interface body while taking measurements.

Naturally, the invention is not limited to the embodiments described and covers any variant coming within the ambit of the invention as defined by the claims.

In particular, although the preferred embodiment of the measuring device has six main characteristics, the invention applies to measuring devices that do not have all of those characteristics, which characteristics can be implemented independently of one another.

At least a portion of the electronic circuit may occupy all or part of the space that exists between the structure and the cover.

The acquisition unit 1000 may be incorporated in the base 10, which then includes a computer unit associated with a human-machine interface, e.g. including a keyboard and a screen.

The reinforcing appendix 601 is optional.

The tab 112 need not be in the form of a curved plate, for example it could be in the form of a button.

The first annular sealing gasket mounted on the pin of the tab so as to bear against the surface of the tube coupling part may be of numerous shapes, for example it could be an O-ring, a lobe seal, or a lip seal.

The second annular sealing gasket mounted between the tubular coupling part and the male cylindrical portion so as to be deformed between them when the male cylindrical portion is mounted in the tubular coupling part secured to the interface body may be of some other shape, for example it could be an O-ring.

The tab is arranged to be movable about the axis of its pin between a locking position and an unlocking position for the mechanism, with the tab having an intermediate position in which the locking mechanism allows the male portion to be inserted and held resiliently without being locked. Different structures allowing other modes of operation are possible. It is thus possible not to have a snap-fastening position.

The lever 704 may be of a shape other than that described, and for example it could comprise only one branch. Also, the lever could be mounted to pivot or to slide.

The fastener mechanism controlled by the lever 704 may be of a structure that is different from that described, and for example it could have only one hook. The snap-fastening position may be arranged on one side or the other of the other two positions instead of lying between them.

Even though this is not the preferred embodiment, the handle 301 could be provided with at least one button and/or with at least one electronic component.

The fastener base may be provided with one or more buttons and/or one or more electronic components, or it may have none.

The handle 301 may be fastened to the fastener base 600 by means other than the screw 609, and for example it could be fastened by a snap-fastener mechanism or by a transverse pin passing through a portion of the handle 301 and a portion of the fastener base 600.

The reinforcing portion 601 may extend over all or part of the handle 301.

The base 600 may be fastened to the interface body 100 by other means, e.g. by one or more screws, by a pin, etc.

The arm may be of a structure different from that described, e.g. having some other number of segments, hinges that are simple instead of being double or double instead of being triple, and/or segments that are telescopic . . . .

The interface body need not have a display and/or electronic circuits.

The lever 604 may be secured to a shaft 605 carrying a stud bearing against the rocker latch 607 in order to form a cam that moves the rocker latch 607 between its two positions.

The measuring members may be touch probes of different shapes and/or sizes, for example they could be angled, having one or more pointing ends of different shapes and/or sizes (e.g. spherical or conical) . . . .

The measuring members may be telemetric, e.g. optical and in particular stereoscopic, or laser (lidar type), etc.

The grippable body 200 may be fastened to the interface body 100 by other means, and for example by a nut screwed onto the tubular coupling part 110, a pin engaged transversely in the grippable body 200 and the tubular coupling part 110, a sloping key engaged transversely in the grip body 200 and the tubular coupling part 110 . . . .

The arm may be provided with one or more multifunction buttons and/or with one or more single-function buttons.

The locking mechanism 1100 may have a structure other than that described, and for example it may comprise a hook that is movable between a locking position in which the hook is engaged in a ring carried by the male portion, and an unlocking position in which the hook is disengaged from said ring.

What is claimed is:

1. A three-dimensional measuring device, comprising:
  an arm made up of articulated elements including:
    a first fastener base,
    a first segment connected to the base by a first hinge,
    a second segment connected to the first segment by a second hinge,
    an interface body connected to the second segment by a third hinge; and
    position sensors associated with the hinges and electrically connected to an electronic acquisition unit for supplying the electronic acquisition unit with position measurement signals measuring the positions of the segments relative to one another, the interface body carrying a first measuring member,
  the interface body removably affixed to a second fastener base and the second fastener base removably affixed to a handle, the handle enables an operator to point the first measuring member at a zone of an object that is to be measured, the second fastener base includes a tubular reinforcing portion extending away from the interface body, a distal end of the reinforcing portion includes a tapped hole to receive a screw therein, a proximal end of the handle adjacent to the second fastener base includes a cavity to receive the reinforcing portion and having a similar shape as the receiving portion, a distal end of the handle opposite the proximal end of the handle having a hole through which a screw couples the handle to the tapped hole of the reinforcing portion.

2. The measuring device according to claim 1, wherein the second fastener base includes an acquisition control button that acts on a switch electrically connected to the electronic acquisition unit.

3. The measuring device according to claim 1, including a set of interchangeable handles of different outside dimensions, each configured to be affixed to the reinforcing portion.

4. The measuring device according to claim 1, wherein the handle does not include any electronic circuit portion.

5. The measuring device according to claim 1, wherein the first hinge and the second hinge are double hinges that allow the elements that they connect together to pivot relative to each other about two mutually perpendicular axes.

6. The measuring device according to claim 1, wherein the third hinge is a triple hinge that allows the second segment and the interface body to pivot relative to each other about three axes, one of which is substantially perpendicular to the others.

7. The measuring device according to claim 1, wherein the interface body is provided with a display device and an electronic circuit that are electrically connected to the electronic acquisition unit.

8. The measuring device according to claim 7, wherein the display device is fitted with a multidirectional button for making selections in menus displayed by the display device.

9. The measuring device according to claim 7, wherein the interface body comprises a rigid structure over which there is mounted a cover in such a manner that there exists a space between the structure and the cover, at least a portion of the electronic circuit extending into the space.

10. The measuring device according to claim 1, wherein the measuring device includes a fastener support for fastening a second measuring member.

11. The measuring device according to claim 10, wherein the fastener support comprises a body having two housings formed therein and opening out in opposite faces of the body, one of the housings having dimensions for receiving a front portion of the interface body, and the other housing having dimensions enabling a portion of the second measuring member to be fastened therein.

12. The measuring device according to claim 1, wherein the tubular reinforcing portion includes a feature that mates with a matching feature of the cavity that prevents the handle from rotating with respect to the second fastener base.

13. The measuring device according to claim 1, wherein the feature is a lengthwise rib that protrudes from a side surface of the reinforcing portion and the matching feature is a lengthwise channel that is relieved from a side surface of the cavity and slightly larger in cross section than the rib.

14. The measuring device according to claim 1, wherein when the first measuring member includes a contactless sensor, one of the handle or the second fastener base includes a button controlling a switch connected to the electronic acquisition unit that enables an operator to cause measurement signals to be acquired.

15. The measuring device according to claim 1, wherein when the first measuring member includes a contact sensor, a switch connected to the electronic acquisition unit that enables an operator to cause measurement signals to be acquired is activated in response the first measuring member makes contact with an object to be measured.

16. The measuring device according to claim 1, wherein the handle may be removed from the second fastener base while the second fastener base is affixed to the interface body.

17. The measuring device according to claim 1, wherein the handle is affixed to the second fastener base by one of a snap-fastener mechanism or a transverse pin passed through the handle and the second fastener base.

* * * * *